US012747096B2

(12) United States Patent
McLaughlin et al.

(10) Patent No.: US 12,747,096 B2
(45) Date of Patent: Sep. 29, 2026

(54) AUTOMATED, SELF-MOVING TRASH OR RECYCLING BIN

(71) Applicant: Synchronous Technologies & Innovations, Inc., Fife, WA (US)

(72) Inventors: Rick Patrick McLaughlin, Milton, WA (US); Jillian Marie Callet, Milton, WA (US)

(73) Assignee: Synchronous Technologies & Innovations, Inc., Fife, WA (US)

( * ) Notice: Subject to any disclaimer, the term of this patent is extended or adjusted under 35 U.S.C. 154(b) by 0 days.

(21) Appl. No.: 18/649,174

(22) Filed: Apr. 29, 2024

(65) Prior Publication Data

US 2025/0115421 A1 Apr. 10, 2025

Related U.S. Application Data

(63) Continuation of application No. 18/485,242, filed on Oct. 11, 2023, now Pat. No. 11,970,334.

(Continued)

(51) Int. Cl.
*B65F 1/14* (2006.01)
*B65F 1/02* (2006.01)
(Continued)

(52) U.S. Cl.
CPC .............. *B65F 1/1473* (2013.01); *B65F 1/02* (2013.01); *B65F 1/1615* (2013.01);
(Continued)

(58) Field of Classification Search
CPC ........ B65F 1/1473; B65F 1/02; B65F 1/1615; B65F 1/1646; B65F 2210/128;
(Continued)

(56) References Cited

U.S. PATENT DOCUMENTS 10,286,558 B1 * 5/2019 Asada .................... B25J 13/003
10,831,201 B2 * 11/2020 Spence ..................... B65F 3/00
10,857,925 B1 12/2020 Sahota
11,884,485 B1 * 1/2024 Ebrahimi Afrouzi .. G05D 1/225
11,915,631 B2 * 2/2024 Wang ....................... G09G 3/14
(Continued)

FOREIGN PATENT DOCUMENTS

CN 109573395 B 4/2022
CN 114693055 A 7/2022
WO WO 2021/106005 A1 6/2021

OTHER PUBLICATIONS

International Search Report for PCT/US2024/049565 dated Jan. 8, 2025.

*Primary Examiner* — Yazan A Soofi
(74) *Attorney, Agent, or Firm* — Knobbe, Martens Olson & Bear, LLP

(57) ABSTRACT

Described herein are devices, systems and methods related to automated waste management. Aspects of the present disclosure include devices, systems, and methods comprising an autonomous waste bin. The autonomous waste bin may include a first and second driving wheels connected to a base of a hollow receptacle. The autonomous waste bin may include a first and second driving motor connected to the first and second driving wheels respectively, the first and second driving motor configured to provide a driving force to the first and second driving wheels. The autonomous waste bin may include at least one controller in communication with the first and second driving motors, the at least one controller configured to control the movement of the autonomous waste bin, via the first and second driving wheels.

23 Claims, 19 Drawing Sheets

Related U.S. Application Data

(60) Provisional application No. 63/588,091, filed on Oct. 5, 2023.

(51) Int. Cl.

| | |
|---|---|
| ***B65F 1/16*** | (2006.01) |
| ***G05D 1/226*** | (2024.01) |
| ***G05D 1/43*** | (2024.01) |
| ***G05D 105/00*** | (2024.01) |

(52) U.S. Cl.
CPC ........... *B65F 1/1646* (2013.01); *G05D 1/226* (2024.01); *G05D 1/43* (2024.01); *B65F 2210/128* (2013.01); *B65F 2210/165* (2013.01); *B65F 2210/168* (2013.01); *G05D 2105/14* (2024.01)

(58) Field of Classification Search
CPC .... B65F 2210/168; G05D 1/226; G05D 1/43; G05D 2105/14
USPC ............................................................... 701/2
See application file for complete search history.

(56) References Cited

U.S. PATENT DOCUMENTS

| | | | | |
|---|---|---|---|---|
| 11,970,334 | B1 | 4/2024 | McLaughlin et al. | |
| 2013/0087562 | A1 | 4/2013 | Thukral et al. | |
| 2014/0239059 | A1* | 8/2014 | Flood | B65F 1/1473 235/375 |
| 2014/0340197 | A1 | 11/2014 | Flood | |
| 2017/0011580 | A1 | 1/2017 | Huang et al. | |
| 2017/0217678 | A1* | 8/2017 | Uffner | B65F 1/02 |
| 2018/0074511 | A1* | 3/2018 | Rodoni | B65F 3/02 |
| 2018/0164828 | A1* | 6/2018 | Dumitras | G01G 19/52 |
| 2019/0255582 | A1* | 8/2019 | Boyle | B65F 1/12 |
| 2020/0064853 | A1 | 2/2020 | Dumitras | |
| 2020/0391642 | A1* | 12/2020 | Brown | B60P 1/283 |
| 2021/0078797 | A1 | 3/2021 | Wolfenden | |
| 2021/0133697 | A1 | 5/2021 | Flood | |
| 2021/0188541 | A1* | 6/2021 | Kurani | G06Q 10/08 |
| 2021/0406485 | A1 | 12/2021 | Flood | |
| 2022/0044208 | A1 | 2/2022 | Borowski | |
| 2022/0371819 | A1* | 11/2022 | Collins | B65F 1/1473 |
| 2023/0210295 | A1* | 7/2023 | Anderson | H04N 7/181 |
| 2023/0363360 | A1* | 11/2023 | Odlin | A01K 61/90 |
| 2024/0051145 | A1* | 2/2024 | Asami | B25J 9/163 |

* cited by examiner

AUTOMATED, SELF-MOVING TRASH OR RECYCLING BIN

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 18/485,242, filed Oct. 11, 2023, which claims the benefit under 35 U.S.C. § 119(e) of U.S. Provisional Patent Application No. 63/588,091, filed Oct. 5, 2023, the disclosure of which is hereby incorporated by reference in its entirety.

BACKGROUND

Technical Field

The disclosed technology relates to waste receptacles, and in particular to autonomous wheeled waste receptacles which can move between a waste pickup location and a waste receptacle storage location.

Description of the Related Art

Municipal waste collection services can provide residents with dedicated waste receptacles where available or the resident can purchase their own waste receptacle, which users are responsible for moving to dedicated locations at specific times. Municipal waste collection vehicles then collect the waste, often by employing pickup arms that grasp the waste receptacle and tip the waste receptacle over the waste collection vehicle to empty its contents into the waste collection vehicle.

If a resident forgets to bring the waste receptacle to the dedicated waste pickup location, the municipal waste collection vehicle will not collect the resident's waste for that pickup period. If there is a delay in waste collection services, particularly if the delay is not scheduled in advance, the resident's waste receptacle may remain at the dedicated pickup location for an extended period of time, cluttering the street or alley. Typically, residents position their own waste bins in a specific location prior to collection. A resident may knowingly or unknowingly place their waste bin in a difficult to access location, which can increase the amount of time a waste collection vehicle spends during collection and in turn increase the carbon emissions of the vehicle. Additionally, a bin placed in a difficult location can lead to traffic delays and/or accidents when the waste collection vehicle attempts to service the bin.

In addition, the waste receptacles are typically unsecured when deployed at the dedicated waste pickup location, ensuring access to the waste receptacle by the waste collection vehicle, but leaving the waste receptacle vulnerable to vandalism or other unwanted interference when positioned at the dedicated waste pickup location. Oftentimes personal information can be found in a waste receptacle, so an unsecured receptacle can possibly lead to identify theft. An unsecured waste receptacle additionally can lead to increase waste spillage caused by bins being overturned prior to or during collection.

Embodiments of the disclosed technology address certain deficiencies of existing waste receptacles and waste collection services, including reducing time needed for a waste collection vehicle to collect waste from customer bin locations, reducing the number of accidents related to accessing waste bins in difficult pickup locations, reducing carbon emissions of waste collection vehicles as the time for collection is reduced, reducing identity theft or other unwanted interference with waste items, and reducing litter caused by bins overturning at collection sites or in waste bin storage locations.

SUMMARY

In some aspects, the techniques described herein relate to an autonomous waste bin, the bin including: a hollow receptacle with an opening at an upper end of the receptacle; a lid connected to the hollow receptacle and configured to cover the opening of the receptacle; a first and second driving wheels connected to a base of the hollow receptacle; a first and second driving motor connected to the first and second driving wheels respectively, the first and second driving motor configured to provide a driving force to the first and second driving wheels; a freely rotatable support wheel connected to the base of the hollow receptacle; a leveling mechanism connected to the freely supportable support wheel, the leveling mechanism configured to adjust the distance between the freely rotatable support wheel and the base of the hollow receptacle; and at least one controller in communication with the first and second driving motors, the at least one controller configured to control the movement of the autonomous waste bin, via the first and second driving wheels, the at least one controller further in communication with leveling mechanism, the controller configured to control the leveling mechanism.

In some aspects, the techniques described herein relate to an autonomous waste bin, further including an inclinometer in communication with the at least one controller, the inclinometer configured to provide an indication of an orientation of the autonomous waste bin relative to the vertical.

In some aspects, the techniques described herein relate to an autonomous waste bin, wherein the at least one controller is configured to control the leveling mechanism to adjust the distance between the freely rotatable support wheel and the base of the hollow receptacle based at least in part on the received orientation indication.

In some aspects, the techniques described herein relate to an autonomous waste bin, further including at least one communication module, the at least one communication module configured to communicate with local devices or remote devices.

In some aspects, the techniques described herein relate to an autonomous waste bin, wherein the at least one communications module includes a local area communications module.

In some aspects, the techniques described herein relate to an autonomous waste bin, wherein the local area communications module includes at least one transceiver, the least one transceiver configured to communicate via Bluetooth or Wi-fi with at least one local device.

In some aspects, the techniques described herein relate to an autonomous waste bin, wherein the at least one local device includes at least one of the following: a user computing device, a waste collection vehicle, and a charging station.

In some aspects, the techniques described herein relate to an autonomous waste bin, wherein the at least one communications module includes a wide area communications module.

In some aspects, the techniques described herein relate to an autonomous waste bin, wherein the wide area communications module includes at least one transceiver, the least one transceiver configured to communicate via 4G, 5G, or Edge with at least one external device.

In some aspects, the techniques described herein relate to an autonomous waste bin, wherein the at least one external device includes a cloud server.

In some aspects, the techniques described herein relate to an autonomous waste bin, further including a locking mechanism, the locking mechanism configured to secure the lid relative to the hollow receptacle such that the lid is retained in a closed position covering the opening of the hollow receptacle.

In some aspects, the techniques described herein relate to an autonomous waste bin, wherein the controller is in communication with the locking mechanism and is configured to operate the locking mechanism.

In some aspects, the techniques described herein relate to an autonomous waste bin, wherein the controller is configured to the operate the locking mechanism based at least in part on an indication received from the inclinometer.

In some aspects, the techniques described herein relate to an autonomous waste bin, further including a position sensor configured to provide an indication of the position of the autonomous waste bin.

In some aspects, the techniques described herein relate to an autonomous waste bin, wherein the position sensor includes an absolute position sensor configured to provide an indication of a location of the autonomous waste bin.

In some aspects, the techniques described herein relate to an autonomous waste bin, wherein the position sensor includes a local position sensor configured to detect a relative position of the autonomous waste bin relative to a local feature.

In some aspects, the techniques described herein relate to a method for deploying an autonomous waste bin for service, the method including: receiving scheduling information, via a communication module of the autonomous waste bin; determining a time to move to a collection location based on the scheduling information received; moving, via a first and second driving wheels, from an initial location to a collection location; awaiting collection from a waste collection vehicle; and after collection, returning to the initial location from the collection location.

In some aspects, the techniques described herein relate to a method, further including: prior to moving to the collection location, locking a lid of the autonomous waste bin such that a hollow receptacle of the autonomous waste bin is covered; receiving, via the communication module, an unlock signal from a service provider; and unlocking the lid of the autonomous waste bin in response to the unlock signal received from the service provider.

In some aspects, the techniques described herein relate to a method, further including transmitting collection information to a service provider.

In some aspects, the techniques described herein relate to a method, wherein the collection information includes weight information of the items contained in the autonomous waste bin.

In some aspects, the techniques described herein relate to a method, wherein moving from an initial position to a collection location includes following a predetermined path between the initial location of the autonomous waste bin and the collection location.

In some aspects, the techniques described herein relate to a method, wherein the scheduling information includes an estimated date and time for collection.

In some aspects, the techniques described herein relate to a method, wherein the scheduling information is received from a service provider.

In some aspects, the techniques described herein relate to a system for automated waste management, the system including: an automated waste bin, the automated waste bin including: a hollow receptacle with an opening at an upper end of the receptacle; a lid connected to the hollow receptacle and configured to cover the opening of the receptacle; a power source; a first and second driving wheels connected to a base of the hollow receptacle; a first and second driving motor connected to the first and second driving wheels respectively, the first and second driving motor configured to provide a driving force to the first and second driving wheels; at least one controller in communication with the first and second driving motors, the at least one controller configured to control the movement of the autonomous waste bin, via the first and second driving wheels; and a charging station configured to charge the autonomous waste bin.

In some aspects, the techniques described herein relate to a system, wherein the automated waste bin further includes wireless charging circuitry configured to receive wireless charging to recharge the power source.

In some aspects, the techniques described herein relate to a system, wherein the charging station further includes a station controller, wherein the controller is configured to control the flow of electrical power between the charging station and the autonomous waste bin.

In some aspects, the techniques described herein relate to a system, wherein the station controller is configured to control the flow of electrical power between the charging station and autonomous waste bin is based on a battery charge state of a battery of the autonomous waste bin.

In some aspects, the techniques described herein relate to a method for deploying an autonomous waste bin for waste collection service, the method including: triggering, based at least in part on scheduling information, movement of the autonomous waste bin along a predefined path between a waste bin storage location and a waste collection location, a locking mechanism of the autonomous waste bin remaining in a locked configuration during the movement along the predefined path; and after arrival of the autonomous waste bin at the waste collection location and prior to collection of the contents of the autonomous waste bin by a waste collection service, triggering an unlocking the locking mechanism of the of the autonomous waste bin to allow access to the contents of the autonomous waste bin.

In some aspects, the techniques described herein relate to a method, wherein triggering movement of the autonomous waste bin along a predefined path includes controlling two independently controllable drive wheels of the autonomous waste bin to move the autonomous waste bin along the predefined path.

In some aspects, the techniques described herein relate to a method, wherein triggering an unlocking the locking mechanism of the of the autonomous waste bin is performed: in response to receiving an unlock signal from the waste collection service; upon arrival of the autonomous waste bin at the waste collection information; or based at least on part on the scheduling information.

In some aspects, the techniques described herein relate to a method, further including, after collection of the contents of the autonomous waste bin by a waste collection service, moving the autonomous waste bin along the predefined path between the waste collection location and the waste bin storage location.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
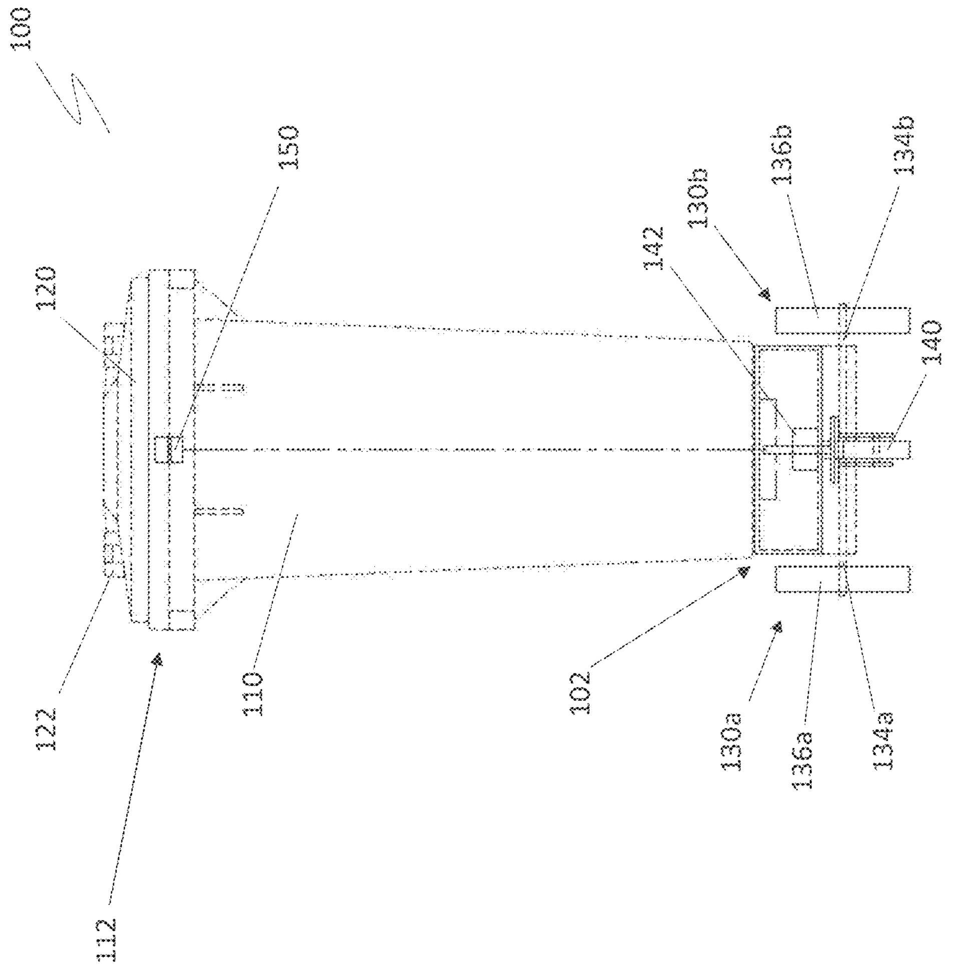
FIG. 1 is a front view of an autonomous waste bin.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

Figure 2:
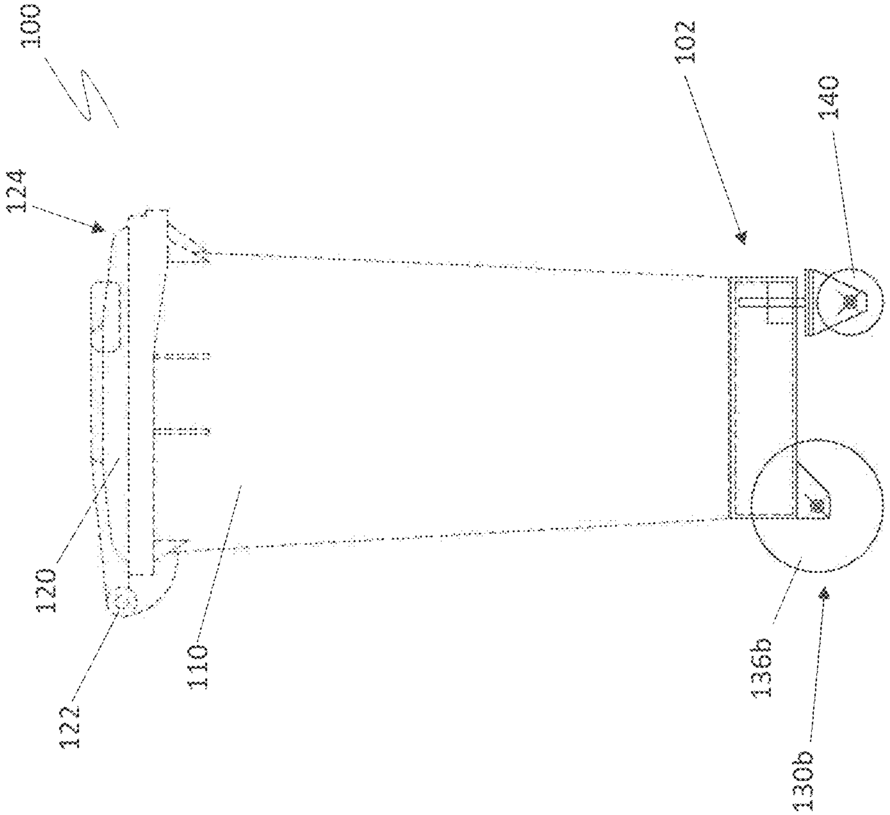
FIG. 2 is a side view of the autonomous waste bin of FIG. 1.

FIG. 1 is a front view of an autonomous waste bin. FIG. 2 is a side view of the autonomous waste bin of FIG. 1. The autonomous waste bin 100 includes a hollow receptacle portion 110 having an opening 112 at its upper end. The receptacle opening 112 is covered by a lid 120 connected to the hollow receptacle portion 112 by at least one hinge 122. The autonomous waste bin 100 also includes a plurality of wheels at the base 102 of the autonomous waste bin, including at least first and second driving wheels 130*a* and 130*b* and a freely rotatable support wheel 140.

In the illustrated embodiment, the hollow receptacle portion 110 is generally rectangular in cross section with rounded corners, tapering slightly outward with increased distance from the ground. In the illustrated embodiment, the lid 120 is a single contiguous structure having a generally rectangular shape with rounded corners, and extends over and slightly beyond the edges of the opening 112 to cover the entire opening 112. In other embodiments, however, any other suitable design may be used for the receptacle portion 110 and the lid 120. For example, in other embodiments, the receptacle portion 110 may be generally cylindrical in shape, or may be of any other suitable shape, and the lid 120 may be dimensioned to generally match the cross-sectional shape at the top of the receptacle portion 110.

When unsecured, the lid 120 can be allowed to open when the autonomous waste bin 100 is held in an inverted position by a waste collection vehicle, allowing the contents of the receptacle portion 110 to be emptied into the waste collection vehicle, or otherwise removed from the autonomous waste bin 100. The autonomous waste bin 100 also includes a locking mechanism 150 which in the illustrated implementation is located adjacent the free end 124 of the lid 120 opposite the hinge 122. In the illustrated implementation, the locking mechanism 150 can include a locking element which can be controlled to translate and/or rotate to engage a feature on the lid 120 to constrain movement of the lid 120 and restrict access to the receptacle portion 110 of the autonomous waste bin 100. In some embodiments, the locking mechanism may include a magnetic lock or latch.

Figure 3:
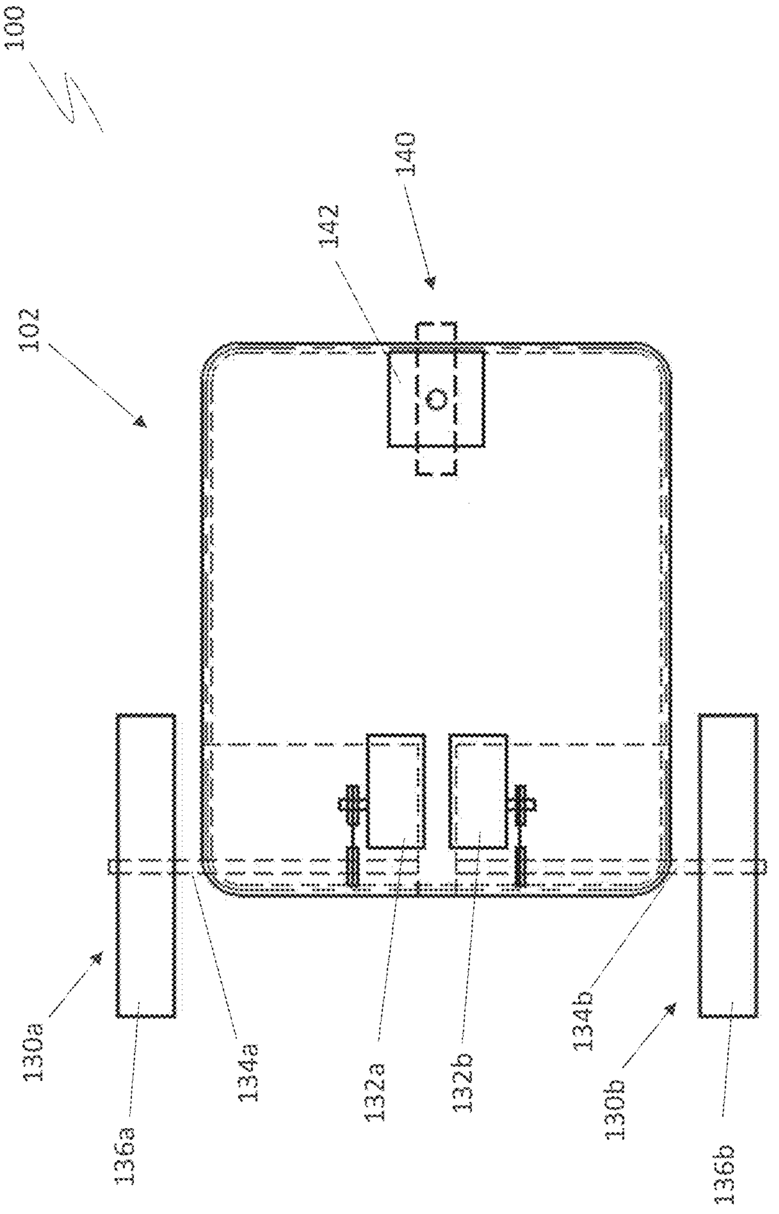
FIG. 3 is a bottom view of the base of the autonomous waste bin with the hollow receptacle, lid and adjoining features removed.

FIG. 3 is a bottom view of the base 102 of the autonomous waste bin 100 with the hollow receptacle, lid and adjoining features removed. Additionally, a bottom surface of the base 102 is omitted from this figure to allow certain internal features at or near the base 102 to be seen. The autonomous waste bin 100 includes a first driving wheel 130*a* on a first side of the vehicle, and a second driving wheel 130*b* on a second side of the vehicle. The first and second driving wheels 130*a* and 130*b* are located on the same side of the autonomous waste bin 100, referred to herein as the rear side of the autonomous waste bin 100, as the hinge 122. The freely rotatable support wheel 140 is located on the same side of the autonomous waste bin 100 as the locking mechanism 150, referred to herein as the front side of the autonomous waste bin 100.

The first driving wheel 130*a* is operably connected to or includes a first driving motor 132*a*, and the second driving wheel 130*b* is operably connected to or includes a second driving motor 132*b*. For example, the first driving wheel 130*a* can be rotatably connected to the first driving motor 132*a* by an axle 134*a*, as shown, and the second driving wheel 130*b* can be connected to the second driving motor 132*b* by an axle 134*b*. However, in other embodiments, the motors may be integral with the driving wheels, or may be connected by other means for transmitting rotational power, including but not limited to gearboxes or other geared arrangements. In the illustrated embodiment, the first and second driving wheels 130*a* and 130*b* are coaxial with one another, and are axially offset from the first and second driving motors 132*a* and 132*b* and connected to their respective one of the first and second driving motors 132*a* and 132*b* by a gear and/or belt arrangement to transmit rotational force between the first and second driving motors 132*a* and 132*b* and the first and second driving wheels 130*a* and 130*b*, although other arrangements may be used in other embodiments. In other embodiments, for example, the first and second driving motors 132*a* and 132*b* may be coaxial with the first and second driving wheels 130*a* and 130*b*, and the axles 134*a* and 134*b* may directly couple the first and second driving motors 132*a* and 132*b* to their respective one of the first and second driving motors 132*a* and 132*b*. In some embodiments, the connection between first and second driving motors 132*a* and 132*b* and their respective one of the first and second driving motors 132*a* and 132*b* may provide a mechanical advantage to adapt the autonomous waste bin 100 for use with certain driving motors and/or wheels, as well as adapt the autonomous waste bin 100 for use in certain operating conditions.

In some embodiments, the first and second driving motors 132*a* and 132*b* may be stepper motors. In some embodiments, the first and second driving motors 132*a* and 132*b* may be configured to operate at variable speeds, allowing the first and second driving wheels 130*a* and 130*b* to be driven at various speeds. In some embodiments, the first and second driving motors 132*a* and 132*b* may be configured to gradually increase speed to an ultimate operating speed and gradually decrease speed when the autonomous waste bin comes to a stop. This configuration may be beneficial for accelerating the first and second driving wheels 130*a* and 130*b* to an operating speed without a sudden change in the speed of the autonomous waste bin 100 as motion begins or as the autonomous waste bin 100 comes to a stop, as such a jerking motion can cause the autonomous waste bin 100 to tip over.

In some embodiments, the first and second driving wheels 130*a* and 130*b* may be supported by a suspension including one or more shock absorbers. In various embodiments, the tires 136*a* and 136*b* of first and second driving wheels 130*a* and 130*b* may be adapted for the particular terrain and/or weather in which the autonomous waste bin 100 is deployed. For example, studded "snow-tire" type tires may be used in areas in which waste collection operates regularly in wintry conditions. If the road or driveway is a dirt road or roughly paved, a more robust suspension or larger tires may be used to improve the operation of the autonomous waste bin 100 on uneven ground.

In the illustrated embodiment, the freely rotatable support wheel 140 may be undriven by a motor, so that the driving force is provided solely by the driving motors 132*a* and 132*b*. The distance between the freely rotatable wheel 140 and the overlying section of the base 102 of the autonomous waste bin 100 can be adjustable through the use of a leveling mechanism 142, which can be controlled to vary a distance between the freely rotatable wheel 140 and the base 102 over a range of the leveling mechanism 142. In the illustrated embodiment, the leveling mechanism 142 is disposed at least partially within the autonomous waste bin 100 above the base 102, but in other embodiments, the leveling mechanism may be located below the base 102 at least partially outside of the autonomous waste bin 100.

In some embodiments, the leveling mechanism 142 may be configured such that operation of the leveling mechanism 142 while the autonomous waste bin 100 is on level ground moves autonomous waste bin 100 through a range of tilt angles with a level state near the middle of the range. In other embodiments, however, the leveling mechanism 142 may be configured such that operation of the leveling mechanism 142 while the autonomous waste bin 100 is on level ground moves autonomous waste bin 100 through a range of tilt angles with a level state at or near one end of the range. Such a configuration allows the effective leveling range of the leveling mechanism 142 to be effectively doubled, as the autonomous waste bin 100 can be driven in a first direction up a grade, and a second direction down a grade.

Figure 4:
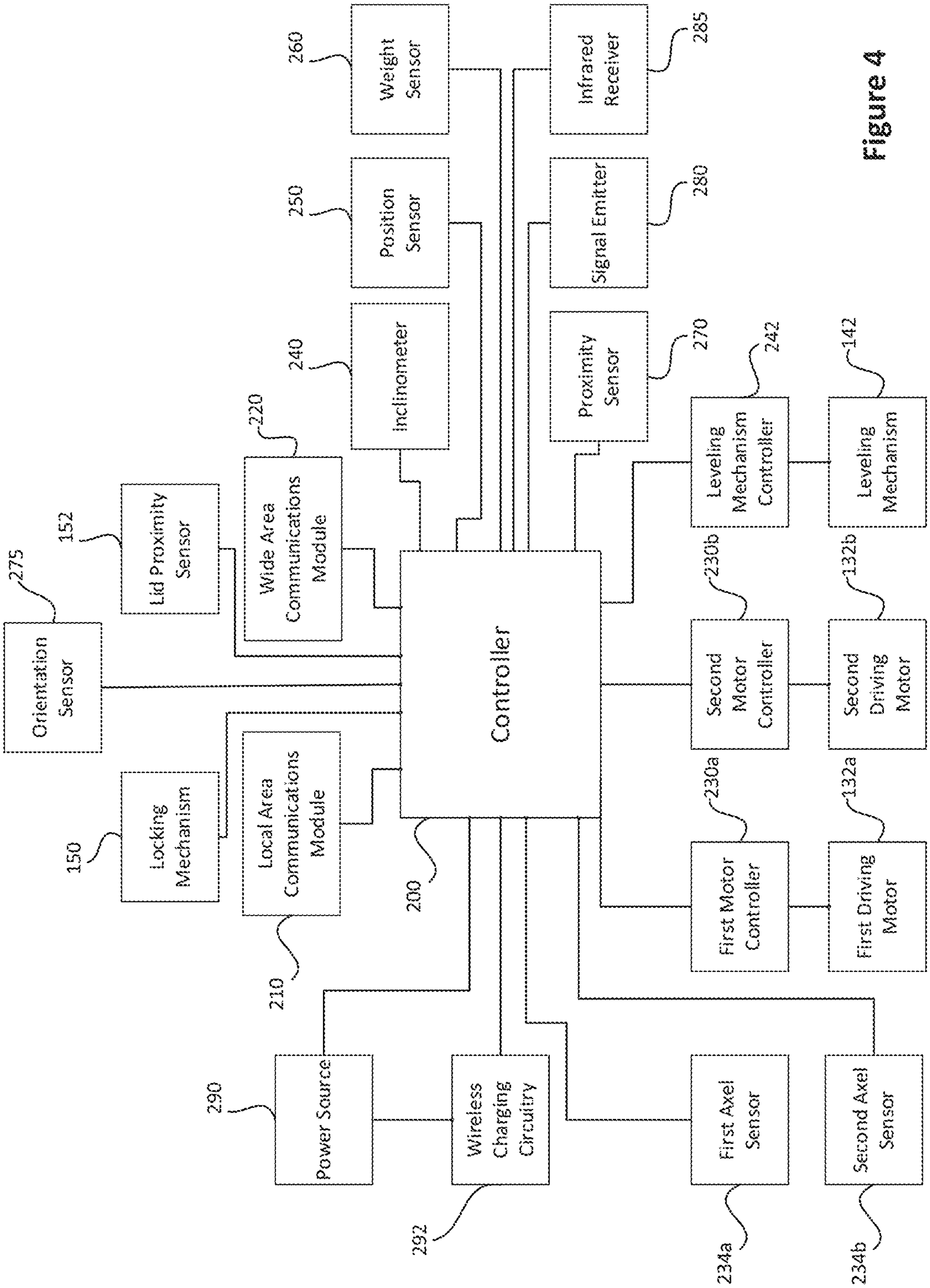
FIG. 4 is a block diagram schematically illustrating various components of the autonomous waste bin of FIG. 1.

FIG. 4 is a block diagram schematically illustrating various components of the autonomous waste bin 100 of FIG. 1. The autonomous waste bin 100 includes a controller 200 which can be used in autonomously controlling the operation of the autonomous waste bin 100. The controller 200 may include one or more processors, integrated circuits, field-programmable gate array or any other suitable control circuitry. In one embodiment, the controller 200 includes a Raspberry Pi system. In the illustrated embodiment, the controller 200 includes or is in communication with a local area communications module 210 and a wide area communications module 220. The local area communications module 210 may include one or more transceivers able to communicate via Bluetooth, Wi-Fi, or any other suitable local area communication protocol with local devices, such as a user computing device, a waste collection vehicle, or a charging station as described in greater detail elsewhere herein. The wide-area communications module 220 may include one or more transceivers able to communicate via 4G, 5G, Edge or any other suitable wide area communication protocol with external devices, including remote devices such as cloud servers or other network entities.

As can be seen in FIG. 4, the controller 200 is also in communication with various components of the autonomous waste bin 100, including the locking mechanism 150. The communication between the controller 200 and the locking mechanism 150 may be wired or wireless. The controller 200 may send a signal to the locking mechanism 150 to command a position of the locking element, to lock or unlock the bin. A change in state of the locking mechanism 150 may be commanded in response to a user command, to allow a user to deposit waste into a previously locked receptacle. The controller 200 may also unlock the locking mechanism 150 automatically in response to detection of a user device, such as a smartphone or smartwatch, near the autonomous waste bin 100, so that the user may not need to take action to send an explicit unlocking command. The controller 200 can also command a change in state of the locking mechanism 150 in response to a signal received from a waste collection vehicle or a waste collection service provider, or in response to detection of a waste collection vehicle near the autonomous waste bin 100. Such remotely-controlled locking and unlocking allows the locking mechanism 150 to be kept in a locked position prior to or after collection.

The locking mechanism may also include a lid proximity sensor 152, such as a Hall effect sensor, to detect whether the lid 120 is in a closed position prior to commanding movement of the locking element to lock the locking mechanism 150. If the lid proximity sensor 152 does not indicate that the lid 120 is closed, the controller 200 may send an error message via one of the local area communications module 210 or wide-area communications module 220 rather than commanding movement of the locking mechanism to a locked position, as a deployed locking element may interfere with later closure of the lid 120.

The locking mechanism 150 may in some embodiments be relocked in response to a command from a user or from another source. In other embodiments, the controller 200 may command movement of the locking element to lock the locking mechanism 150 upon closure of the lid 120, or after a delay period after closure of the lid 120. In some embodiments, a button or other interface element can be pressed by a user to trigger operation of the locking mechanism 150. Such operation can be contingent upon the presence of a user device in close proximity to the autonomous waste bin 100, or through any other suitable user verification or authorization to ensure that access to the waste bin 100 is only provided to users or service providers who should have access.

The controller 200 can also be in communication with additional sensors which can be used control the operation of the autonomous waste bin 100 or otherwise provide information regarding the state of the autonomous waste bin 100. As can be seen in FIG. 4, in the illustrated embodiment, the controller 200 is also in wired or wireless communication with a position sensor 250, which can be used to provide an indication of the position of the autonomous waste bin 100. In some embodiments, the position sensor comprises an absolute position sensor, such as a GPS module, which can provide an indication of the location of the autonomous waste bin 100. In some embodiments, the position sensor may include local position sensors for detecting a position of the autonomous waste bin 100 relative to a local feature such as a charging station. A local position sensor can be used to more precisely guide the autonomous waste bin 100 to a known location such as the position of a charging station if operation of the autonomous waste bin 100 is disrupted. In addition, a local position sensor can be used to more precisely align the autonomous waste bin 100 with a wireless charging system.

The controller 200 can periodically receive location information from the position sensor 250 and can also request location information from the position sensor 250 at any time. Information from the position sensor 250 can be used to confirm that the autonomous waste bin 100 is at an intended location, such as a designated waste collection position. Information from the position sensor 250 can also be used for geofencing, allowing the controller 200 to send an alarm notification if the autonomous waste bin 100 is removed from its operational location. The position sensor 250 can also be used to provide information to a waste collection service provider regarding an alternative location of the autonomous waste bin 100 if the normal collection location is unavailable due to inclement weather conditions, road construction, or any other circumstance that could impact waste collection operations.

In some embodiments, the controller 200 is connected via a wired or wireless connection to first and second axle sensors 234*a* and 234*b*, which can be used to provide an indication of the position of the autonomous waste bin 100 or a speed of the autonomous waste bin 100. In some embodiments, the first axle sensor 234*a* may be connected to the first axle 134*a* or to the first driving wheel 130*a*. In some embodiments, the second axle sensor 234*b* may be connected to a second axle 134*b* or to the second driving wheel 130*b*. In some embodiments, the controller 200 can receive an indication of the number of rotations of the first and second driving wheels 130*a* and 130*b* or the first and second axles 134*a* and 134*b* from the first and second axle sensors 234*a* and 234*b*. In some embodiments, the controller 200 determines a position of the autonomous waste bin 100 or determines a speed of the autonomous waste bin 100 based on the indication of the number of rotations received from the first and second axle sensors 234*a* and 234*b*. In some embodiments, the first and second axle sensors 234*a* and 234*b* may serve to confirm the information received from the position sensor 250. In some embodiments, the first and second axle sensors 234*a* and 234*b* may provide an indication of the position of the autonomous waste bin 100 in an area where GPS coordinates may be inaccurate.

In some embodiments, the controller 200 is connected via a wired or wireless connection to a weight sensor 260, which can be used to provide an indication of the weight of the items or waste contained in the hollow receptacle portion 110 of the autonomous waste bin 100. The controller 200 can periodically receive weight information from the weight sensor 260 and can also request weight information from the weight sensor 260 at any time. In some embodiments, the weight information may be transmitted via the local area communications module 210 or via the wide-area communications module 220 to a user device, to a waste collection vehicle, or to cloud servers. Information from the weight sensor 260 can be used, for example, in controlling the movement of the autonomous waste bin 100, such as by limiting the movement speed of the autonomous waste bin 100 based on the weight of the bin contents. The weight sensor 260 can also provide information to a waste collection service regarding the weight of the bin contents when the autonomous waste bin 100 is ready for waste collection, allowing the waste collection service to anticipate the amount of waste to be collected along a given route and redirect waste collection vehicles as needed to optimize waste collection.

In some embodiments, the controller 200 is connected via a wired or wireless connection to one or more proximity sensors 270, which can be used to provide an indication when the autonomous waste bin 100 is within a certain distance of an object or obstacle. In some embodiments, the proximity sensors 270 may include one or more infrared transmitters. In some embodiments, the proximity sensor 270 can be used to provide a user with an indication that an obstacle or object is blocking a path of the autonomous waste bin 100. In some embodiments, the indication may be in the form of a notification sent to a user device.

In some embodiments, the controller 200 is connected via a wired or wireless connection to an orientation sensor 275 which can be used to provide an indication of the orientation of the autonomous waste bin 100. In some embodiments, the orientation sensor 275 is a three-axis electronic compass. In some embodiments, the controller 200 can periodically receive orientation information from the orientation sensor 275 and can also request orientation information from the orientation sensor 275 at any time. In some embodiments, the orientation information may be transmitted via the local area communications module 210 or via the wide-area communications module 220 to a user device, to a waste collection vehicle, or to cloud servers. Information from the orientation sensor 275 may be used to orient the autonomous waste bin 100 such that a front facing side of the autonomous waste bin 100 faces a waste collection vehicle in preparation for collection.

In some embodiments, the controller is connected via a wired or wireless connection to a signal emitter 280, which can be used to transmit a signal to control, open, or close a garage door, an automatic gate, or other automated obstacle that blocks the path of the autonomous waste bin 100. In some embodiments, the user may indicate the location of a controllable obstacle such as a gate or a garage door via a user device, and in some particular embodiments may train or otherwise configure the signal emitter 280 to transmit an appropriate signal for controlling a state of the controllable obstacle. In this configuration, the autonomous waste bin 100 may send a signal to the obstacle to open, via the signal emitter 280, upon approaching the obstacle. In some embodiments, the autonomous waste bin 100 may send a signal to the obstacle to open, via the signal emitter 280, when the autonomous waste bin 100 is within a certain distance of the obstacle as indicated by the proximity sensor 270. After passage of the autonomous waste bin 100 beyond a location obstructed by the obstacle or its operation, the autonomous waste bin 100 may send, via the signal emitter 280, a signal to the obstacle to close.

In some embodiments, the controller 200 is connected via a wired or wireless connection to an infrared sensor 285 which can be used to receive an infrared signal. The controller 200 may use information from the infrared sensor 285 to align the autonomous waste bin with an infrared transmitter. In some embodiments, a charging station may include an infrared transmitter, such as one or more infrared LEDs. In this configuration, the controller may align the autonomous waste bin with the charging station based on the infrared signal received by the infrared sensor, so that the autonomous waste bin can be accurately guided into a desired position. In some embodiments, the infrared sensor may be configured to detect obstructions or obstacles along the path of the autonomous waste bin 100. In some embodiments, the infrared sensor 285 can be used to provide a user with an indication that an obstacle or obstruction is blocking a path of the autonomous waste bin 100. In some embodiments, the indication may be in the form of a notification sent to a user device. In some embodiments, the autonomous waste bin 100 can use information received from the infrared sensor 285 to adjust a direction in which the autonomous was bin 100 is moving, to avoid detected obstacles.

As can be seen in FIG. 4, the controller 200 is connected via a wired or wireless connection to a first motor controller 230*a* for controlling the first driving motor 132*a* and to a second motor controller 230*b* for controlling the second driving motor 132*b*. The independent control of the first and second driving motors 132*a* and 132*b* allows the autonomous waste bin 100 to be turned to control the direction in which it faces, as well as to move the autonomous waste bin 100 along a curvilinear path between a charging station and a designated waste collection location. For example, driving only one of the first and second driving motors 132*a* and 132*b*, or driving one motor in a first direction and the second motor in an opposite direction, can cause the autonomous waste bin 100 to rotate in place. Driving both of the driving motors 132*a* and 132*b* in the same direction at the same speed can cause the autonomous waste bin 100 to move in a straight line. Driving both of the driving motors 132*a* and 132*b* in the same direction at different speeds can cause the autonomous waste bin 100 to move in a curved line, turning towards the side of the slower motor.

As can be seen in FIG. 4, the controller 200 can be in wired or wireless connection with an inclinometer 240 configured to provide an indication of the orientation of the autonomous waste bin 100 relative to the vertical. The orientation information from the inclinometer 240 can be used in controlling various features of the autonomous waste bin 100. For example, if the orientation information from the inclinometer 240 indicates that the bin 100 has tipped over, and the bin 100 is not being emptied by a waste collection vehicle, the locking mechanism 150 can remain engaged until the bin 100 has been moved to an upright position.

The orientation information from the inclinometer 240 can also be used in controlling the operation of the leveling mechanism 142, as well as the operation of the driving motors 132*a* and 132*b*. If the inclinometer 240 indicates that the autonomous waste bin 100 is tilting away from the normal, the controller 200 can send a signal to a leveling mechanism controller 242 to command a change in the position of the leveling mechanism 142, altering the spacing between the base 102 of the autonomous waste bin 100 and the ground to level the autonomous waste bin 100 or minimize the tilt of the autonomous waste bin 100 to reduce the likelihood of tipping over.

In some embodiments, the controller 200 may be connected via a wired or wireless connection to a power source 290 of the autonomous waste bin 100, such as a battery, which may provide an indication of the power state of the power source 290, such as the battery charge of a battery. The controller 200 can periodically receive the power state information from power source 290 and can also request power state information from the power source 290 at any time. In some embodiments, the controller 200 can transmit the battery charge state information to a user device or to a charging station.

In some embodiments, the controller 200 may be in communication via a wired or wireless connection to wireless charging circuitry 292, which may wirelessly receive electrical power from an external power source, such as a charging station, for transmission to the power source 290. In some embodiments, a wireless charging station can provide an indication of the power state of the power source 290. In some embodiments, the controller 200, via the wireless charging circuitry, may control a flow of electrical power from an external power source to the power source 290. In some embodiments, the controller 200 is configured to control the flow of electrical power based at least in part on a power state provided by the wireless charging circuitry or by the power source. In some embodiments, the controller 200 is configured to control the flow of electrical power based on the power state of the power source. In some embodiments, the controller 200 is configured to control the flow of electrical power based on the power state of the power source 290 dropping below a threshold value. In other implementations, however, the power source 290 may be recharged by a direct electrical connection, such as by plugging in a charging cable, or bringing electrical contacts on the autonomous waste bin 100 into contact with electrical contacts on a charging station.

Figure 5:
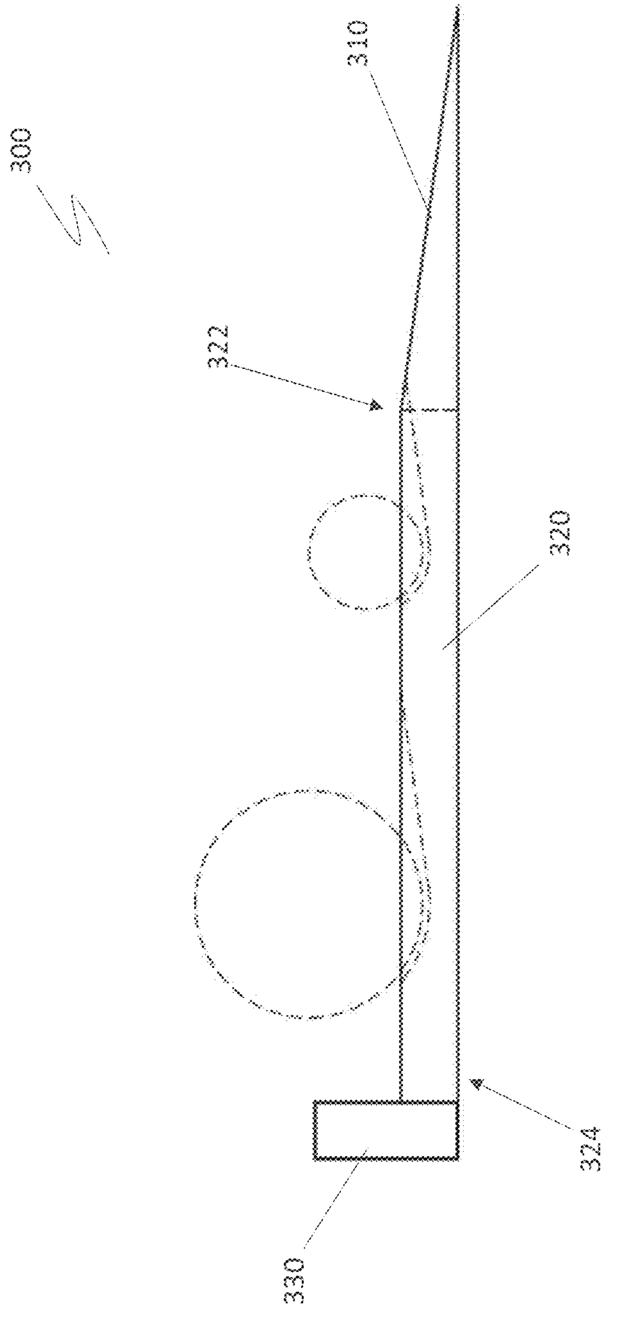
FIG. 5 shows a side view of a charging station.
Figure 6A:
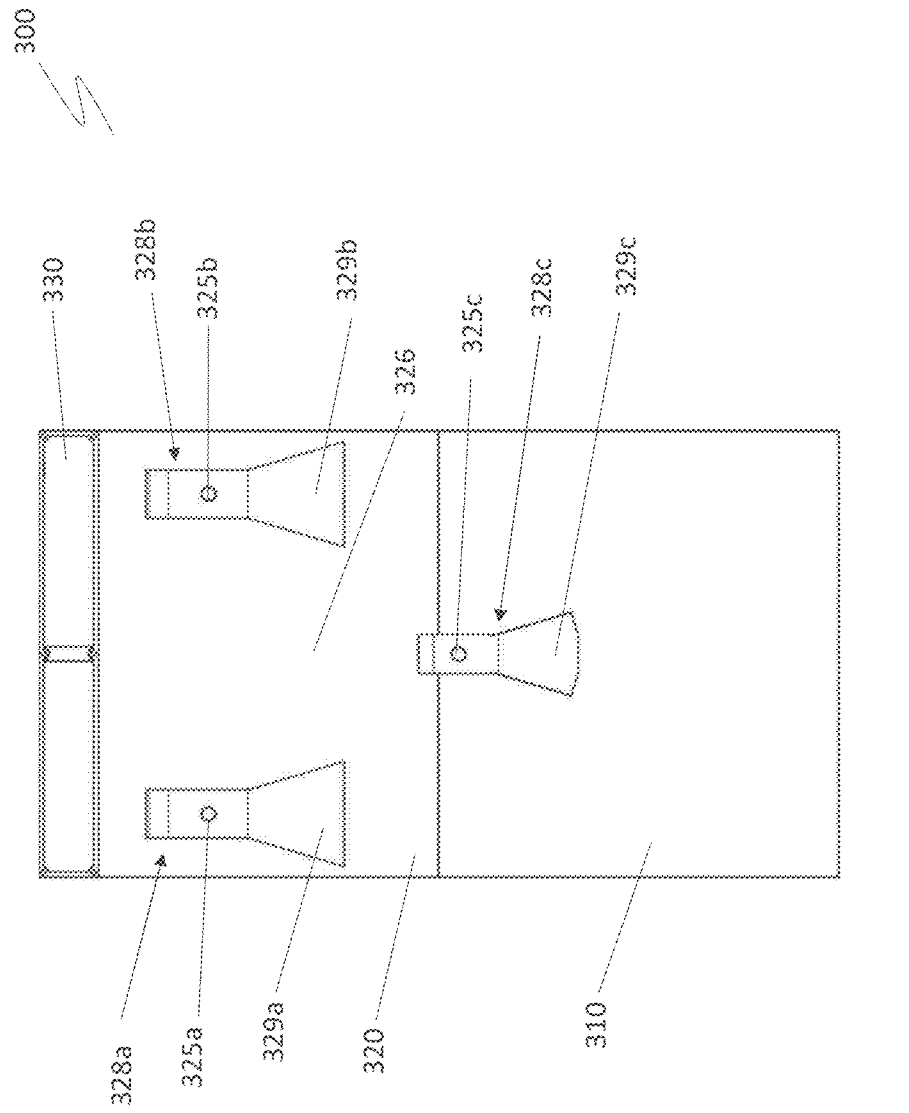
FIG. 6A shows a top view of the charging station of FIG. 5.
Figure 6B:
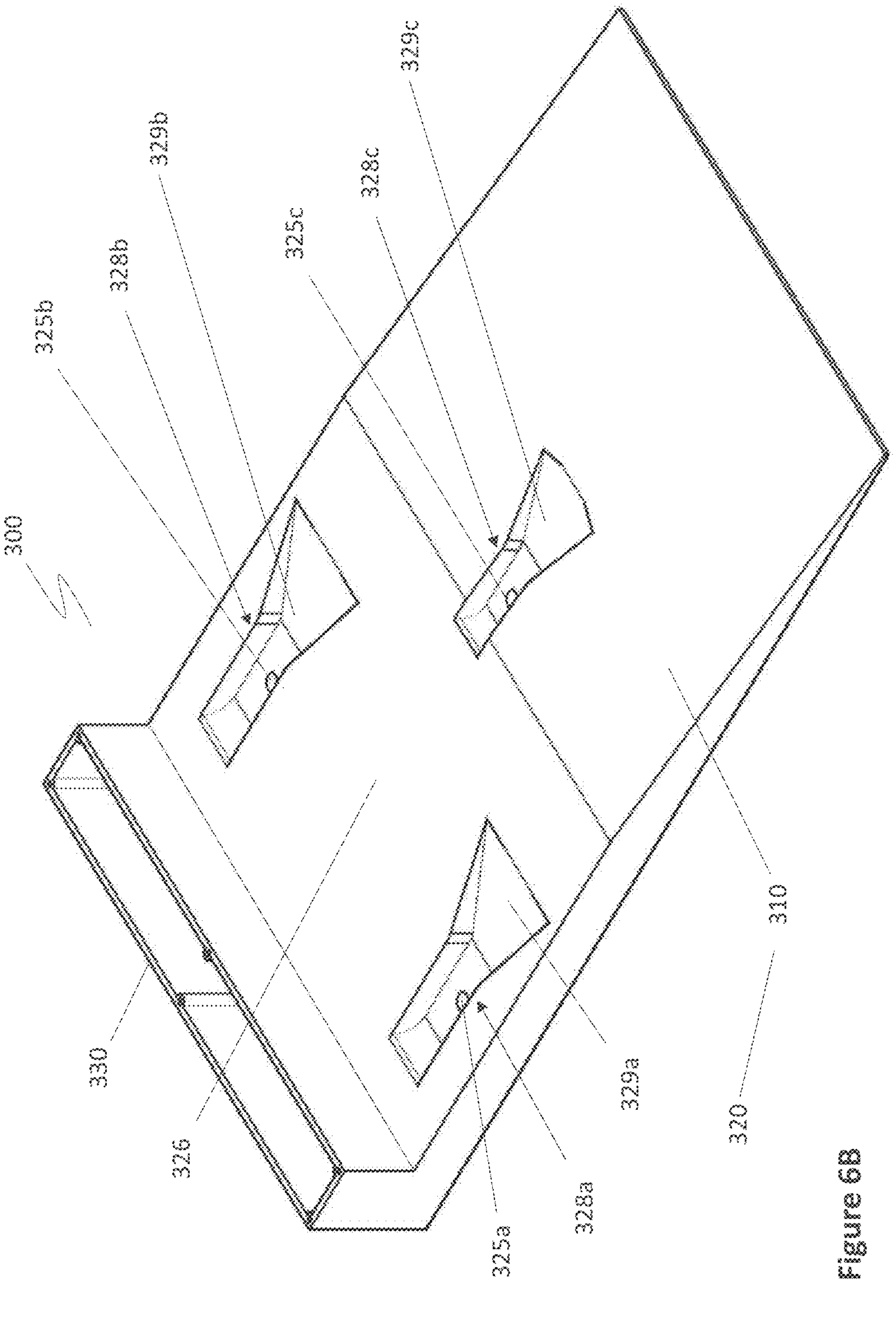
FIG. 6B shows a top perspective view of the charging station of FIG. 6A.

FIG. 5 shows a side view of a wireless charging station 300. FIG. 6A shows a top view of the charging station 300 of FIG. 5. FIG. 6B shows a top perspective view of the charging station of FIG. 5. In the illustrated embodiment, the charging station 300 includes a ramp 310, a raised charging platform 320 and a backstop 330. As seen in FIG. 5, the ramp 310 includes an inclined plane extending from a front edge 322 of the charging platform 320 of the charging station 300. The ramp 310 allows the autonomous waste bin 100 to move under its own power from the ground up to the charging platform 320 of the charging station 300. In the illustrated embodiment, the backstop 330 is connected to or integral with a back portion 324 of the charging platform 320. In other embodiments, the backstop 330 may be an additional structure secured to a rear upper surface of the charging platform 320. In some embodiments, the backstop 330 or a similar structure may also extend along at least part or all of the side edges of the charging platform.

The backstop 330 may be configured and/or dimensioned to prevent the autonomous waste bin 100 from moving beyond or falling off the back portion 324 of the charging platform 320. In some embodiments, the backstop 330 may include a rectangular block connected to the back portion 324 of the charging platform 320 and extending a distance above the charging platform 320. In some embodiments, the backstop 330 may extend a distance that is roughly equal to radius of the first and second driving wheels 130*a* and 130*b*. In some embodiments, the backstop 330 may extend a distance that is roughly equal to a diameter of the first and second driving wheels 130*a* and 130*b*. In other embodiments, a difference in height between the backstop 330 and the charging platform 320 may be less than a diameter of the first or second driving wheels 130*a* and 130*b*, while in other embodiments it may be greater than a diameter of the first or second driving wheels 130*a* and 130*b*.

As seen in FIGS. 6A and 6B, the charging platform 320 of the charging station 300 may comprise a charging pad 326 and a plurality of wheel recesses 328*a*, 328*b*, and 328*c* in the charging platform 320 configured to receive, respectively, the first and second driving wheels 130*a* and 130*b* and the freely rotatable wheel 140. In the illustrated embodiments, the charging pad 326 can comprise one or more charging transmission coils configured to provide wireless or inductive charging between one or more corresponding receiving coils and associated circuitry (not specifically depicted) in the autonomous waste bin 100 while the autonomous waste bin 100 is positioned on the charging station 300. In some embodiments, the charging pad 326 may be in a generally rectangular shape. In some embodiments, the charging pad 326 may be generally circular in shape. In some embodiments, the charging pad 326 may form a part of a top surface of the charging platform 320. In some embodiments, the charging pad 326 may be disposed beneath a top surface of the charging platform 320, and in such a configuration, the charging pad 326 can be configured to provide electrical power to the autonomous waste bin 100 through a top surface of the charging platform 320.

The plurality of wheel recesses 328*a*, 328*b*, and 328*c* are located on the charging platform 320. Each of the wheel recesses 328*a*, 328*b*, and 328*c* may comprise an entry guide portion 329*a*, 329*b*, and 329*c*. The entry guide portions 329*a*, 329*b*, and 329*c* may include a generally planar inclined section extending downward from the upper surface of the charging platform 320 to a base of the wheel recesses 328*a*, 328*b*, and 328*c*. In some embodiments, the entry guide portions 329*a*, 329*b*, and 329*c* may taper inward with increased depth, such that a width of each guide 329*a*, 329*b*, and 329*c* at its front edge may be greater than a width of the guide 329*a*, 329*b*, and 329*c* at its back end near the base of the wheel recesses 328*a*, 328*b*, and 328*c*. Such an arrangement is beneficial for moving the autonomous waste bin 100 onto the charging station 300. The greater width of the front end of the entry guide portions 329*a*, 329*b*, and 329*c* allows the autonomous waste bin 100 to move with a lower degree of precision onto the charging station 300, as the sidewalls of the entry guide portions 329*a*, 329*b*, and 329*c* can mechanically guide the wheels of the autonomous waste bin 100 into the narrower base of the wheel recesses 328*a*, 328*b*, and 328*c*, where they can settle.

The wheel recesses 328*a*, 328*b*, and 328*c* may be recessed into the charging platform 320 by a depth such that when the drive wheels 130*a* and 130*b* and freely rotatable wheel 140 of the autonomous waste bin 100 are seated at or near the base of the wheel recesses 328*a*, 328*b*, and 328*c*, the base of the autonomous waste bin 100 is brought closer to the charging platform 320 and the charging pad 326. This proximity between the base of the autonomous waste bin 100 and the charging pad 326 facilitates the wireless charging of the autonomous waste bin 100. In addition, the wheel recesses 328*a*, 328*b*, and 328*c* mechanically ensure alignment between the at least one transmission coil in the charging pad 326 and the at least one receiving coil in the autonomous waste bin 100, increasing the efficacy and reliability of the wireless power transmission.

In some embodiments, the wheel recesses 328*a*, 328*b* and 328*c* may include drainage holes 325*a*, 325*b*, and 325*c*. The drainage holes 325*a*, 325*b*, and 325*c* may be formed at a lowest depth of each of the wheel recesses 328*a*, 328*b*, and 328*c*. The drainage holes 325*a*, 325*b*, and 325*c* are configured to prevent liquids and other objects from accumulating in the wheel recesses 328*a*, 328*b*, and 328*c*.

Figure 7:
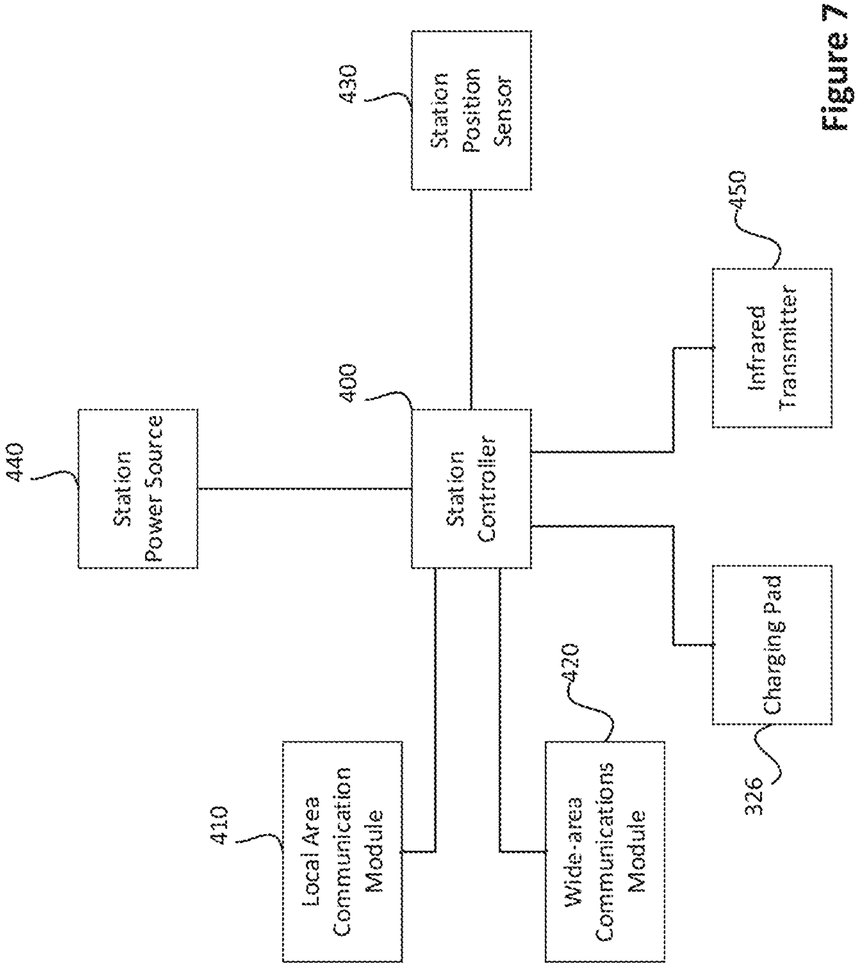
FIG. 7 is a block diagram schematically illustrating various components of the charging station of FIG. 5.

FIG. 7 is a block diagram schematically illustrating various components of the charging station 300 of FIGS. 5, 6A, and 6B. In some embodiments, the charging station 300 includes a station controller 400 which can be used in autonomously controlling the operation of the charging station 300. The station controller 400 may include one or more processors, integrated circuits, field-programmable gate array or any other suitable control circuitry. In one embodiment, the station controller 400 includes a Raspberry Pi system. In some embodiments, the station controller 400 includes or is in communication with a station local area communications module 410 and a station wide area communications module 420. The station local area communications module 410 may include one or more transceivers able to communicate via Bluetooth, Wi-Fi, or any other suitable local area communication protocol with local devices, such as a user computing device, a waste collection vehicle, or the autonomous waste bin 100. The station wide-area communications module 420 may include one or more transceivers able to communicate via 4G, 5G, Edge or any other suitable wide area communication protocol with external devices, including remote devices such as cloud servers or other network entities.

In some embodiments, the station controller 400 may be connected to station power source 440. In some embodiments, the connection with the station power source 440 may be wired, and may include a plug to be inserted into an outlet, or a hardwired connection to an electrical circuit of a user's home or business. The station power source 440 may be electrically connected to the charging pad 326 and may be configured to provide electrical power to the charging pad 326.

In some embodiments, the station controller 400 may be configured to receive power state information from the autonomous waste bin 100, such as via the station local area communication module 410 or the station wide-area communications module 420. This power state information may include a battery charge level or other information indicative of a power state of the autonomous waste bin.

In some embodiments, the station controller 400 may be in wireless or wired communication with the charging pad 326. In some embodiments, the station controller 400 may be configured to control the flow of electrical power from the charging pad 326 to the power source 290 of the autonomous waste bin 100. In some embodiments, the station controller 400 may control the flow of electrical power based on the power state information received from the autonomous waste bin 100. In some embodiments, the station controller 400 may control the overall flow of electrical power based on the power state of the power source 290, such as the power state of the power source 290 dropping below a threshold value, and may control the rate of power transmission based on the current battery state to optimize a parameter such as battery lifetime or charge rate.

In some embodiments, the station controller 400 is also in wired or wireless communication with a station position sensor 430, which can be used to provide an indication of the position of the charging station 300. In some embodiments, the station position sensor 430 comprises an absolute position sensor, such as a GPS module, which can provide an indication of the location of the charging station 300. In some embodiments, the station position sensor 430 may include local position sensors for detecting a position of the charging station 400 relative to a local feature such as the autonomous waste bin 100. A local position sensor can be used to more precisely guide the autonomous waste bin 100 to a known location such as the position of a charging station 300 if operation of the autonomous waste bin 100 is disrupted. In addition, a local position sensor can be used to more precisely align the autonomous waste bin 100 with the charging station 300.

In some embodiments, the station position sensor 430 may only include local position sensors as described above, or may not include any position sensors. In such configurations, the controller 400 may be configured to receive absolute position information from the autonomous waste bin 100. In some embodiments, the controller 400 may request absolute position information from the controller 200 of the autonomous waste bin 100 when the autonomous waste bin 100 is positioned on the charging station 300. The controller 400 may be configured to transmit, via the station local area communications module 410 or the station wide-area communications module 420, the absolute position information to a user device, a cloud server, or a service provider.

In some embodiments, the controller 400 is connected via a wired or wireless connection to an infrared transmitter 450 which can be used to emit infrared waves or light. The infrared transmitter 450 may be configured to operate in conjunction with the infrared sensor 285 to align the autonomous waste bin 100 with the charging station 300. In some embodiments, the infrared transmitter 450 may be configured to continuously emit an infrared wave, light or signal. In some embodiments, the controller 400 may control the emission of infrared signals from the infrared transmitter 450 based on a proximity of the autonomous waste bin 100 to the charging station 300. In some embodiments, the infrared transmitter 450 may include a plurality of infrared transmitters arranged in a pattern which provides the autonomous waste bin 100 with information regarding its position relative to the charging station 300.

Figure 8:
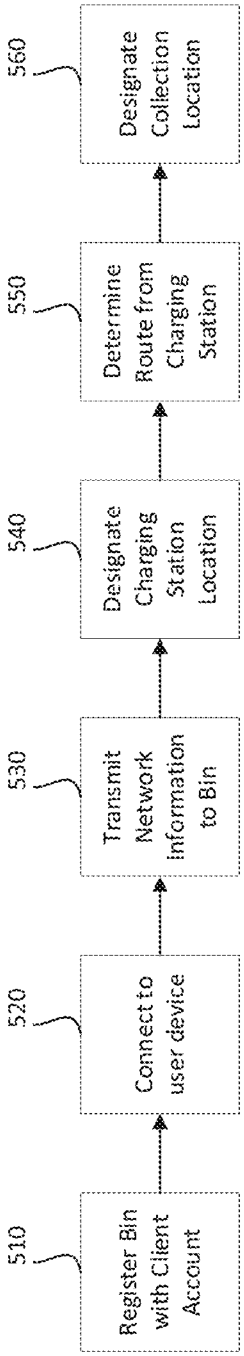
FIG. 8 shows a block diagram of a process for setting up an autonomous waste bin as described above for automatic service.

FIG. 8 shows a block diagram of a process for setting up an autonomous waste bin 100 as described above for automatic service. The process starts with block 510. In process block 510, the autonomous waste bin 100 may be registered with a client account. In some embodiments, registering the autonomous waste bin 100 with the client account may comprise imputing a bin ID into a user device. In block 520, the user, via the user device, may connect to the autonomous waste bin 100. In some embodiments, the user may connect to the autonomous waste bin 100 via a wireless connection such as a bluetooth connection. As seen in block 530, after connecting to the autonomous waste bin 100, the user transmits network information to the autonomous waste bin 100. In some embodiments, the network may be a cellular network, Wi-fi network, WLAN, or WWAN. After transmitting the network information to the autonomous waste bin 100, the user may be prompted to designate a charging station location.

In block 540, the user designates the charging station location. In some embodiments, the user designates the charging station location by placing the charging station 300 at a first location. In some embodiments, the user designates the charging station location by placing the charging station 300 at a first location and moving the autonomous waste bin 100 to the charging station 300 such that the autonomous waste bin 100 begins charging. In some embodiments, the user designates the charging station location by interacting with a user device. In block 550, the user defines a designated path that the autonomous waste bin 100 will travel. In some embodiments, the user defines the designated path by manually moving the autonomous waste bin 100 to a second location. The autonomous waste bin may constantly monitor its absolute position or the changes in its position while being moved along the designated path, such as via the position sensor 250 or by monitoring the relative movement of the first and second driving wheels 130*a* and 130*b* as the autonomous waste bin 100 is moved along the defined path. The autonomous waste bin 100 may store information defining the designated path in a local memory, and may upload information defining the designated path to an external device or service, such as the cloud server. In block 560, the user designates a collection location. In some embodiments, after the user has manually moved the autonomous waste bin 100 from the charging station location to a second location, the users designate, via a user device, that the autonomous waste bin 100 has arrived at the collection location. In some embodiments, The autonomous waste bin 100 may store information defining the designated collection location in a local memory, and/or may upload the information defining the designated collection location to an external device such as a cloud server.

In some embodiments, the user may designate a charging station location as described above in conjunction with block 540 and a collection location as described in conjunction with block 560. In some embodiments, the autonomous waste bin 100 may include a machine learning module or an artificial intelligence module that is configured to determine a defined path between the designated charging station location and the designated collection location, or to adjust a defined path, such as to optimize a defined path.

Figure 9:
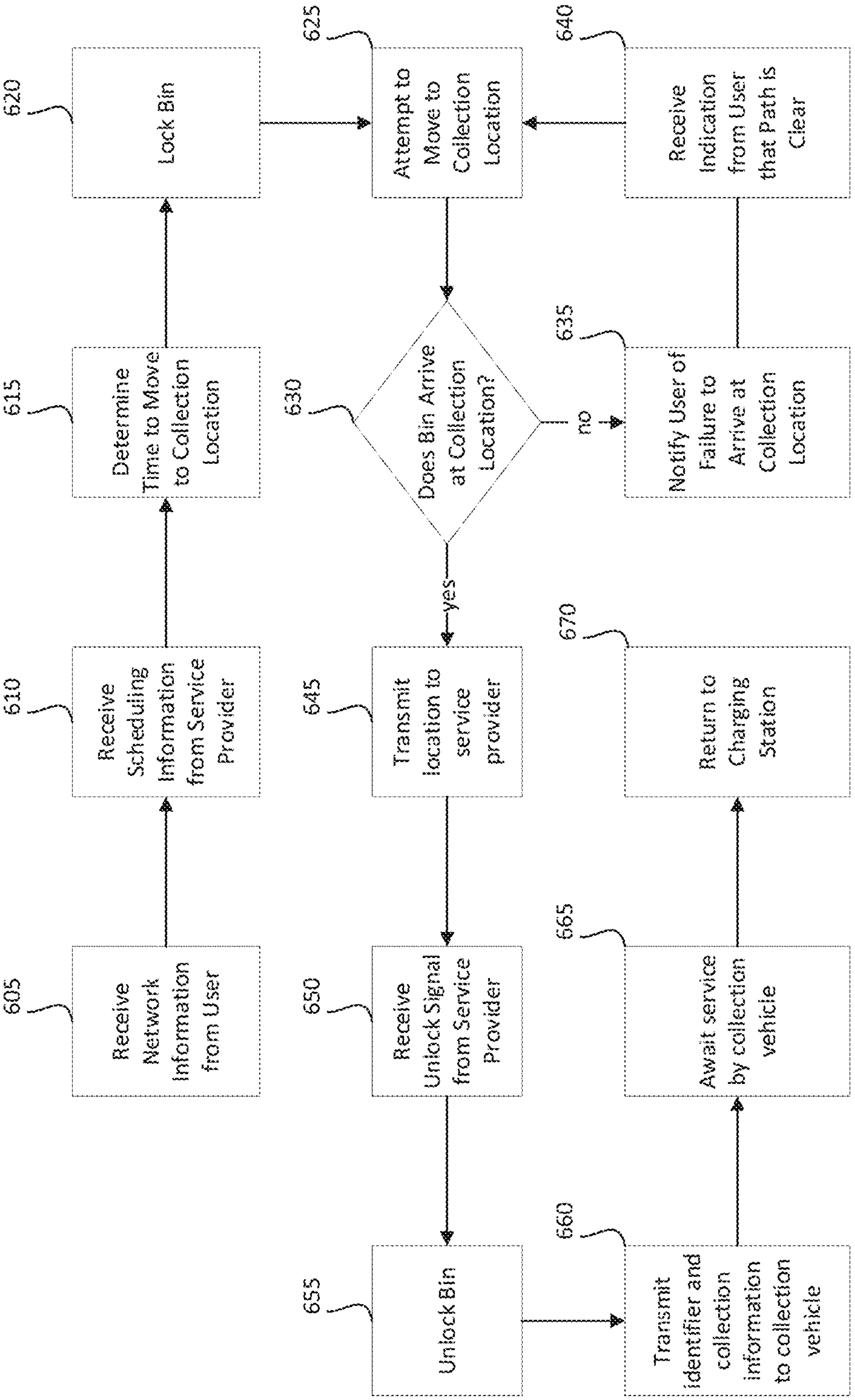
FIG. 9 shows a block diagram of a process of an autonomous waste bin moving from a charging station to a collection location for service.

FIG. 9 shows a block diagram of a process of an autonomous waste bin 100 moving from a charging station 300 to a collection location for service. The process starts with block 605. In block 605, the autonomous waste bin 100 receives network information from a user. In some embodiments, the autonomous waste bin 100 receives the network information via a mobile device of the user. In some embodiments, the autonomous waste bin 100 receives the network information for a cellular or Wi-Fi network, WLAN, or WWAN. In some embodiments, the autonomous waste bin 100 may only receive network information from a user during an initial setup of the autonomous waste bin, like that described in FIG. 8. In this embodiment, the autonomous waste bin 100 may not receive network information from the user again unless the autonomous waste bin 100 becomes disconnected from the networks provided by the user.

In block 610, the autonomous waste bin 100 connects to the network and receives scheduling information from a service provider. In some embodiments, the scheduling information may include an estimated date and time of the next collection. In some embodiments, the scheduling information includes a range of times when the collection may occur. In some embodiments, the scheduling information may include the frequency of collection, such as weekly or biweekly. In some embodiments, the autonomous waste bin 100 may not receive scheduling information from the service provider prior to each collection occurrence. In some embodiments, the autonomous waste bin 100 may only receive scheduling information at a frequency determined by the service provider. In some embodiments, the autonomous waste bin 100 may only receive scheduling information from the service provider prior to an initial collection occurrence. In this embodiment, the autonomous waste bin 100 may receive temporary or permanent changes to the scheduling information from the service provider as necessary.

In block 615, after receiving the scheduling information from the service provider, the autonomous waste bin 100 determines a time to move to the collection location. In some embodiments, the autonomous waste bin 100 may determine a time to move to the collection location that is different from the time determined to move to collection location for a previous collection. In some embodiments, prior to each collection occurrence, the autonomous waste bin may determine a random time to move to the collection that is prior to the collection time. Such a step may be beneficial for reducing the predictability of the autonomous waste bin. This may be especially beneficial for autonomous waste bins that open a garage door or other controllable obstacle to move to the collection location. A randomized time to move to the collection location can make it more difficult for thieves to predict when a garage door or similar entry device will open.

In block 620, when the time to move to the collection location has arrived, the autonomous waste bin 100, via the controller 200, can, if the locking mechanism 150 is not already secured, send a signal to the locking mechanism 150, causing the locking mechanism 150 to secure the lid 120 of the autonomous waste bin 100. In block 625, after locking, the autonomous waste bin 100 will begin to move to the designated collection location via the designated path determined during the user set up process as seen in FIG. 7. In decision block 630, after a period of time, the autonomous waste bin 100, via the position sensor 250, can determine if the autonomous waste bin 100 has arrived at the collection location. If the autonomous waste bin 100 has not arrived at the collection location, the process will proceed to block 635.

In block 635, the autonomous waste bin 100 notifies the user that the autonomous waste bin 100 has failed to arrive at the collection location. In some embodiments, the user is notified via a notification sent to a user device. In some embodiments, the notification may be in the form of a SMS or text message. In some embodiments, the notification may be in the form of a notification on an application on the user device. In some embodiments, the autonomous waste bin 100 may further transmit to the user a reason for the failure to arrive at the collection location, such as an obstacle obstructing the designated path. In block 640, the autonomous waste bin 100 receives a notification from the user that the designated path is clear or that an obstruction has been removed. The process then returns to block 625.

If at decision block 630, the autonomous waste bin 100 determines that the autonomous waste bin 100 has arrived at the collection location, the process proceeds to block 645. In block 645, the autonomous waste bin 100 can transmit information regarding the location of the autonomous waste bin 100 to the service provider, or a confirmation that the autonomous waste bin 100 has arrived at the designated collection location, and await a waste collection vehicle.

In block 650, the autonomous waste bin receives an unlock signal from a service provider or from a waste collection vehicle. In some embodiments, the autonomous waste bin 100 receives an unlock signal when a waste collection vehicle is within a certain distance of the collection location or within a certain distance of the autonomous waste bin 100. As seen in block 655, after receiving the unlock signal from the service provider or from a waste collection vehicle, the autonomous waste bin 100, via the controller, may transmit a signal to the locking mechanism 150, which in turn causes the locking mechanism 150 to unlock thereby allowing the lid 120 rotate freely along the hinges 122.

In block 660, the autonomous waste bin 100 can transmit an identifier to the service provider or service provider vehicle. In some embodiments, the identifier is the bin ID. In some embodiments, the autonomous waste bin may not transmit an identifier to the service provide. In this configuration, an identifier may be scanned by a waste collection vehicle. In some particular embodiments, the identifier may take the form of a radio-frequency identifier (RFID) tag or a marking which can be read by an optical sensor operated by the waste collection service. In this configuration, the identifier may be read by a radio frequency reader or other sensor on a waste collection vehicle. In some embodiments, the autonomous waste bin 100 also transmits collection information to the service provider. In some embodiments, the collection information includes the collection material weight of the autonomous waste bin 100 as measured by the weight sensor 260. In block 665, the autonomous waste bin 100 will wait for the waste collection vehicle to conclude the collection, such as by emptying the autonomous waste bin 100 into the waste collection vehicle. In some embodiments, the weight sensor and/or inclinometer may be used to provide an indication that a waste collection process has been completed, and the emptied bin is in place and ready to be moved from the collection location. In block 670, after being serviced, the autonomous waste bin 100 will return to the charging station 300 via the designated path.

Figure 10:
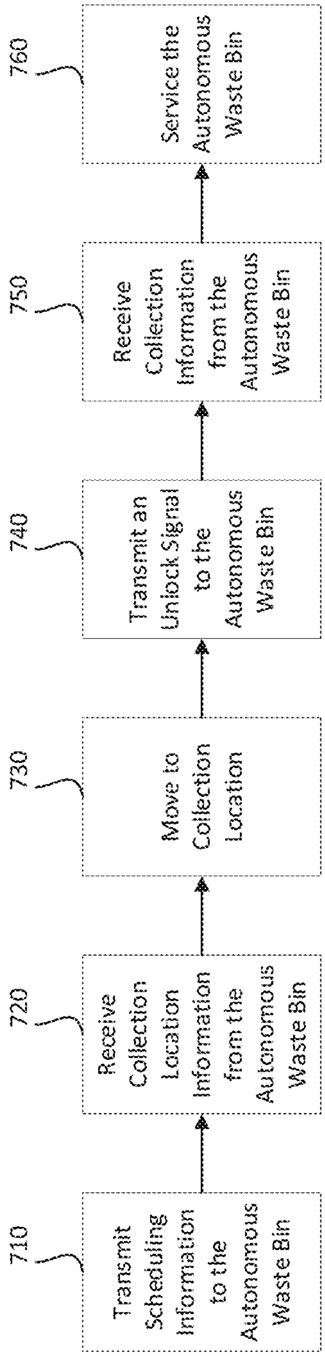
FIG. 10 shows a block diagram of a process of a service provider collecting waste from an autonomous waste bin.

FIG. 10 shows a block diagram of a process of a service provider collecting from an autonomous waste bin 100. The process begins with block 710. In block 710, the service provider transmits scheduling information to an autonomous waste bin 100. In some embodiments, a cloud server associated with a service provider transmits the scheduling information to the autonomous waste bin 100. In some embodiments, a waste collection vehicle associated with the service provider transmits the scheduling information to the autonomous waste bin 100. In some embodiments, the scheduling information may include an estimated date and time of the next collection. In some embodiments, the scheduling information includes a range of times when the collection may occur. In some embodiments, the scheduling information may include a frequency of collection, such as weekly or biweekly.

In block 720, the service provider receives collection location information from the autonomous waste bin 100. In some embodiments, prior to receiving the collection location information, the service provider may request collection location information from the autonomous waste bin 100. In some embodiments, the service provider may receive collection location information from the autonomous waste bin 100 prior to each collection occurring. In some embodiments, the collection location information includes the collection location as set up by the user in FIG. 8. In some embodiments, the collection location information comprises the approximate location of the autonomous waste bin 100. In block 730, a waste collection vehicle associated with service provider moves to the collection location or to the approximate location of the autonomous waste bin 100.

In block 740, the service provider transmits an unlock signal to the autonomous waste bin 100. In some embodiments, a waste collection vehicle may transmit the unlock signal to the autonomous waste bin 100 when the waste collection vehicle is within a certain distance of the autonomous waste bin 100. In some embodiments, a cloud server associated with the service provider may transmit the unlock signal to the autonomous waste bin 100.

In block 750, the service provider receives collection information from the autonomous waste bin 100. In some embodiments, the collection information may include information regarding a weight of the items or waste in the hollow receptacle portion 110 of the autonomous waste bin 100 as measured by the weight sensor 260. In some embodiments, the collection information may include the date and time of the collection occurrence. In some embodiments, the service provider may store the collection information in a local memory or in a cloud server.

In block 760, the waste collection vehicle services the autonomous waste bin 100. In some embodiments, the waste collection vehicle lifts and inverts the autonomous waste bin 100 and empties the autonomous waste bin 100 into the waste collection vehicle.

Figure 11:
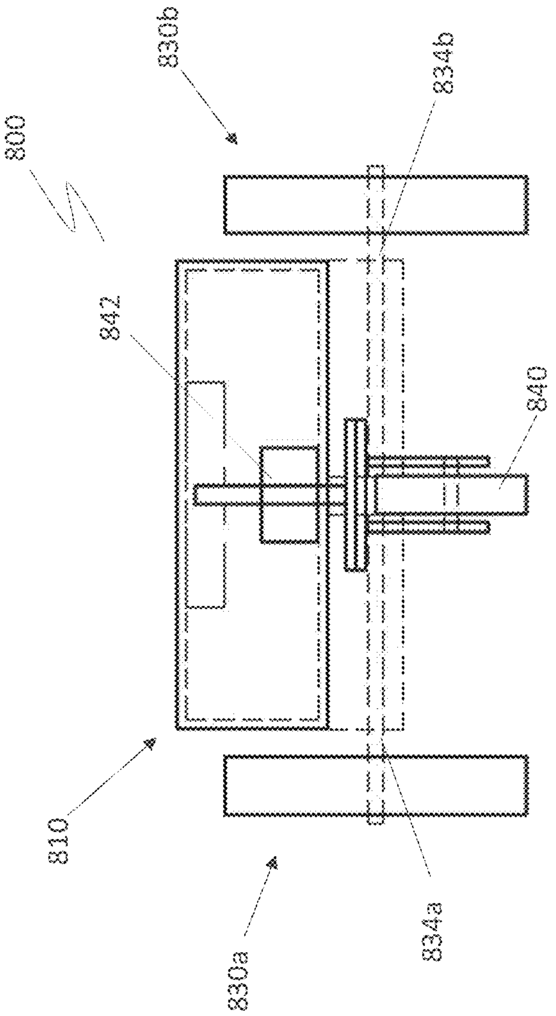
FIG. 11 shows a front view of an autonomous waste bin attachment.

In some embodiments, some or all of the features of an autonomous waste bin may be integrated into the waste bin itself. In other embodiments, however, some or all of the features discussed above may be included in one or more accessory devices which can be used to add autonomous waste bin features to a standard waste bin or other structure. FIG. 11 shows a front view of an autonomous waste bin attachment 800, which can be used to retrofit a standard waste receptacle to provide some or all of the features of the autonomous waste bin 100. Thus, in some embodiments, the autonomous waste bin attachment 800, and a waste bin retrofitted using such an attachment, may comprise many of the same features of the autonomous waste bin 100 as described above.

The autonomous waste bin attachment 800 includes a body 810. The body 810 of the autonomous waste bin attachment 800 is configured to be attached to a waste bin or other receptacle. In some embodiments, the waste bin may comprise a hollow receptacle and a lid similar to that of the autonomous waste bin 100 described above. The body 810 may include securement features (not specifically illustrated) which are configured to secure the autonomous waste bin attachment 800 to a waste bin or other receptacle, and retain the waste bin or other receptacle in place relative to the autonomous waste bin attachment 800 in place. In some embodiments, such as the embodiment illustrated in FIG. 11, the autonomous waste bin attachment 800 may be in the form of a structure which completely or partially surrounds the waste bin or other receptacle at or near its base, so that wheels or other components of the waste bin or other receptacle may remain in contact with the ground, rather than the waste bin or other receptacle being fully supported by the autonomous waste bin attachment 800 and spaced apart from the ground once the autonomous waste bin attachment 800 is installed.

In some embodiments, the autonomous waste bin attachment 800 may be secured directly to the waste bin or other receptacle being modified, without further adjustment. In other embodiments, however, certain components of the waste bin or other receptacle may be modified or removed to facilitate attachment of the autonomous waste bin attachment 800 thereto. In some embodiments, for example, one or more wheels of the waste bin or other receptacle can be removed prior to attachment of the autonomous waste bin attachment 800. This can reduce certain dimensions of the final assembly, and/or provide one or more securement points at which a securement feature of the autonomous waste bin attachment 800 can be secured to the waste bin or other receptacle being retrofitted.

The autonomous waste bin attachment 800 also includes a plurality of wheels connected to the body 810 of the autonomous waste bin attachment 800, including at least first and second driving wheels **830*a* and 830*b* and a freely rotatable support wheel 840. The first and second driving wheels 830*a* and 830*b* and a freely rotatable support wheel 840 may be similar or identical in many respects to the first and second driving wheels 130*a* and 130*b* and a freely rotatable support wheel 140 of the autonomous waste bin 100** as described above.

Figure 12:
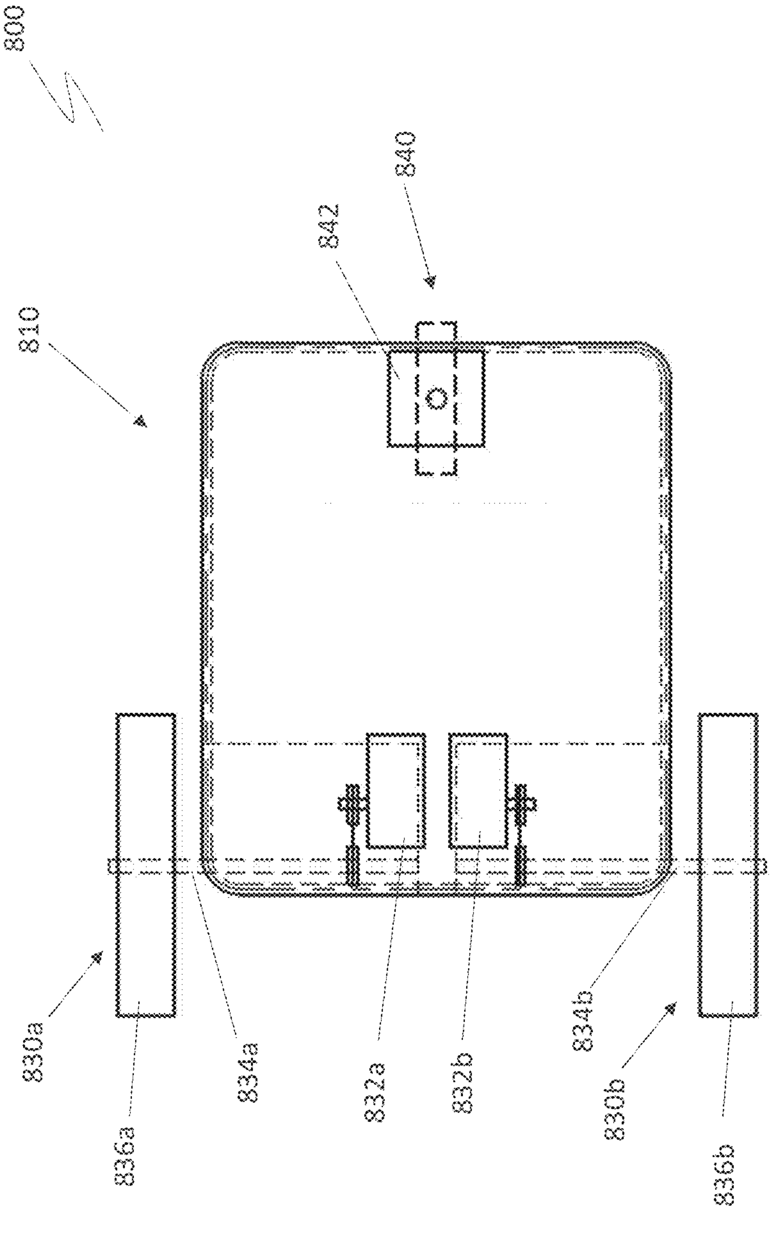
FIG. 12 shows a bottom view of an autonomous waste bin attachment as seen in FIG. 11 with a bottom surface of the body removed.

FIG. 12 shows a bottom view of an autonomous waste bin attachment 800 as seen in FIG. 11 with a bottom surface of the body 810 removed. As seen in FIG. 12, the first driving wheel **830*a* is operably connected to or includes a first driving motor 832*a*, and the second driving wheel 830*b* is operably connected to or includes a second driving motor 132*b*. For example, the first driving wheel 830*a* can be connected to the first driving motor 832*a* by an axle 834*a*, as shown, and the second driving wheel 830*b* can be connected to the second driving motor 832*b* by an axle 834*b*. However, in other embodiments, the motors may be integral with the driving wheels, or may be connected by other means for transmitting rotational power, including but not limited to gearboxes or other geared arrangements. In the illustrated embodiment, the first and second driving wheels 830*a* and 830*b* and the first and second driving motors 832*a* and 832*b* are coaxial with one another, although other arrangements may be used in other embodiments. The first and second driving motors 832*a* and 832*b* and axles 834*a* and 834*b* may be similar or identical in many respects to the first and second driving motors 132*a* and 132*b* and axles 134*a* and 134*b*** described above in connection with the other embodiments.

In the illustrated embodiment, the freely rotatable support wheel 840 may be undriven by a motor, so that the driving force is provided solely by the driving motors **832*a* and 832*b*. The distance between the freely rotatable wheel 840** and the overlying section of the body 810 of the autonomous waste bin attachment 800 is adjustable through the use of a leveling mechanism 842, which can be controlled to vary a distance between the freely rotatable wheel 840 and the body 810 over a range of the leveling mechanism 842. In the illustrated embodiment, the leveling mechanism 842 is disposed at least partially within the autonomous waste bin attachment 800 above the body 810, but in other embodiments, the leveling mechanism 842 may be located below the body 810 at least partially outside of the autonomous waste bin attachment 800. The leveling mechanism may be similar or identical in many respects to the leveling mechanism 142 described above.

Figure 13A:
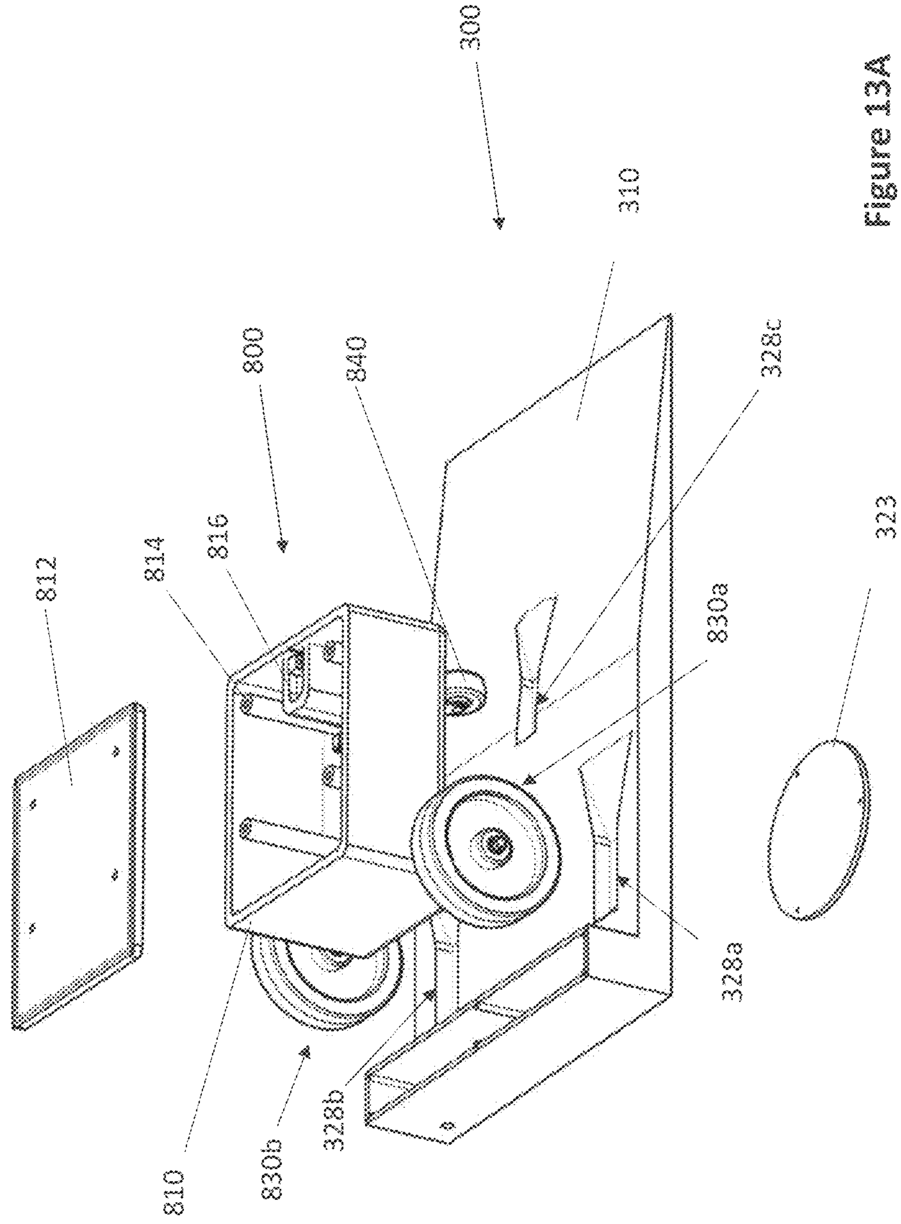
FIG. 13A is a perspective partially-exploded view of an autonomous waste bin attachment such as the autonomous waste bin attachment of FIG. 11, shown relative to charging station such as the charging station of FIG. 5.
Figure 13B:
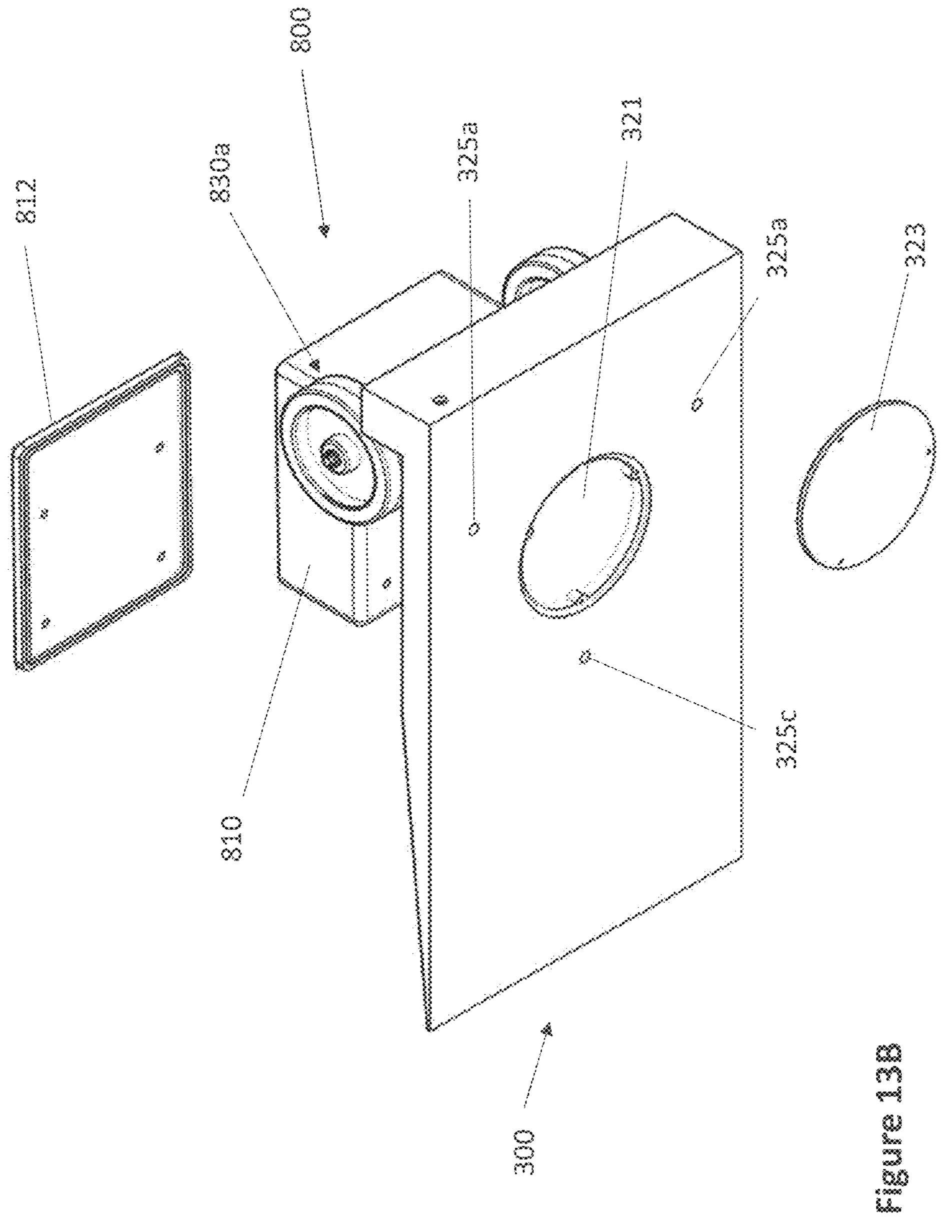
FIG. 13B is a bottom perspective partially-exploded view of the autonomous waste bin attachment and charging station of FIG. 13A.
Figure 13C:
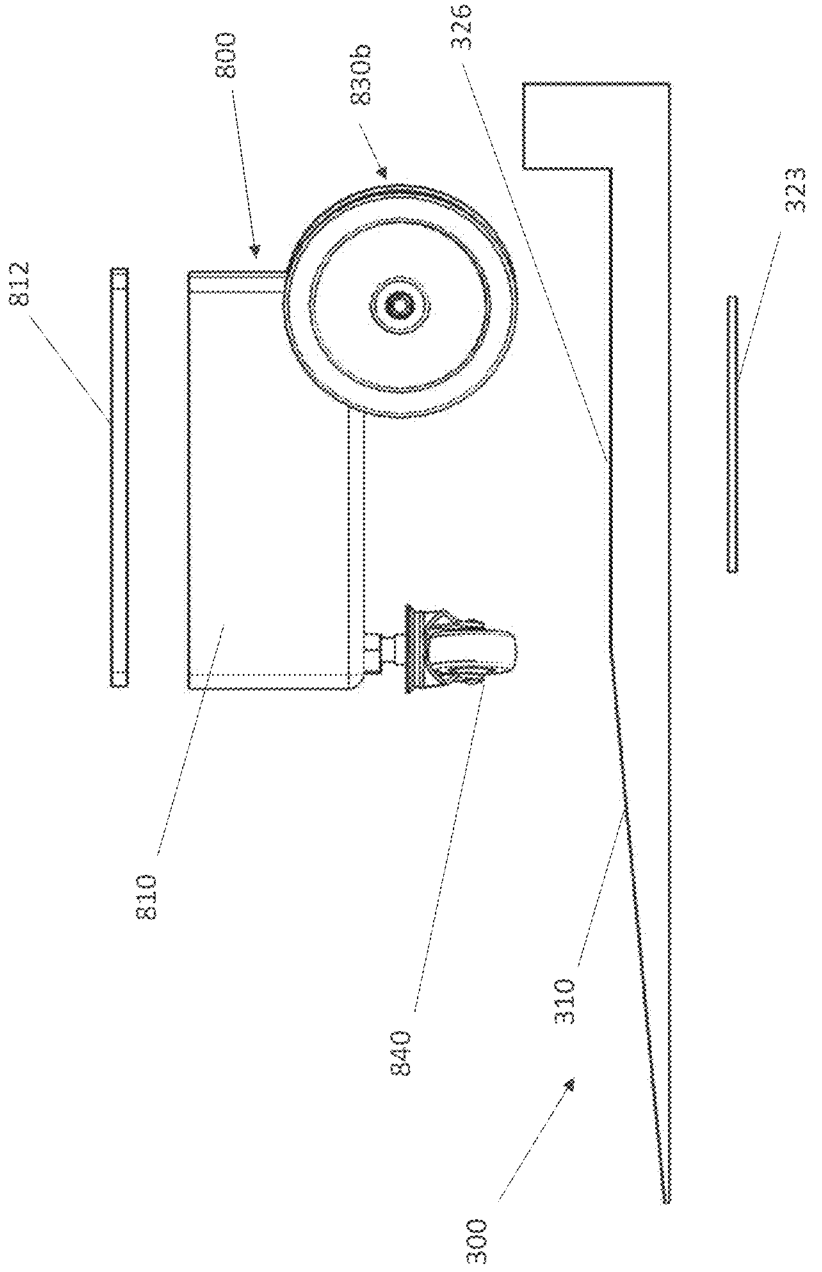
FIG. 13C is a side partially-exploded view of the autonomous waste bin attachment and charging station of FIG. 13A
Figure 13D:
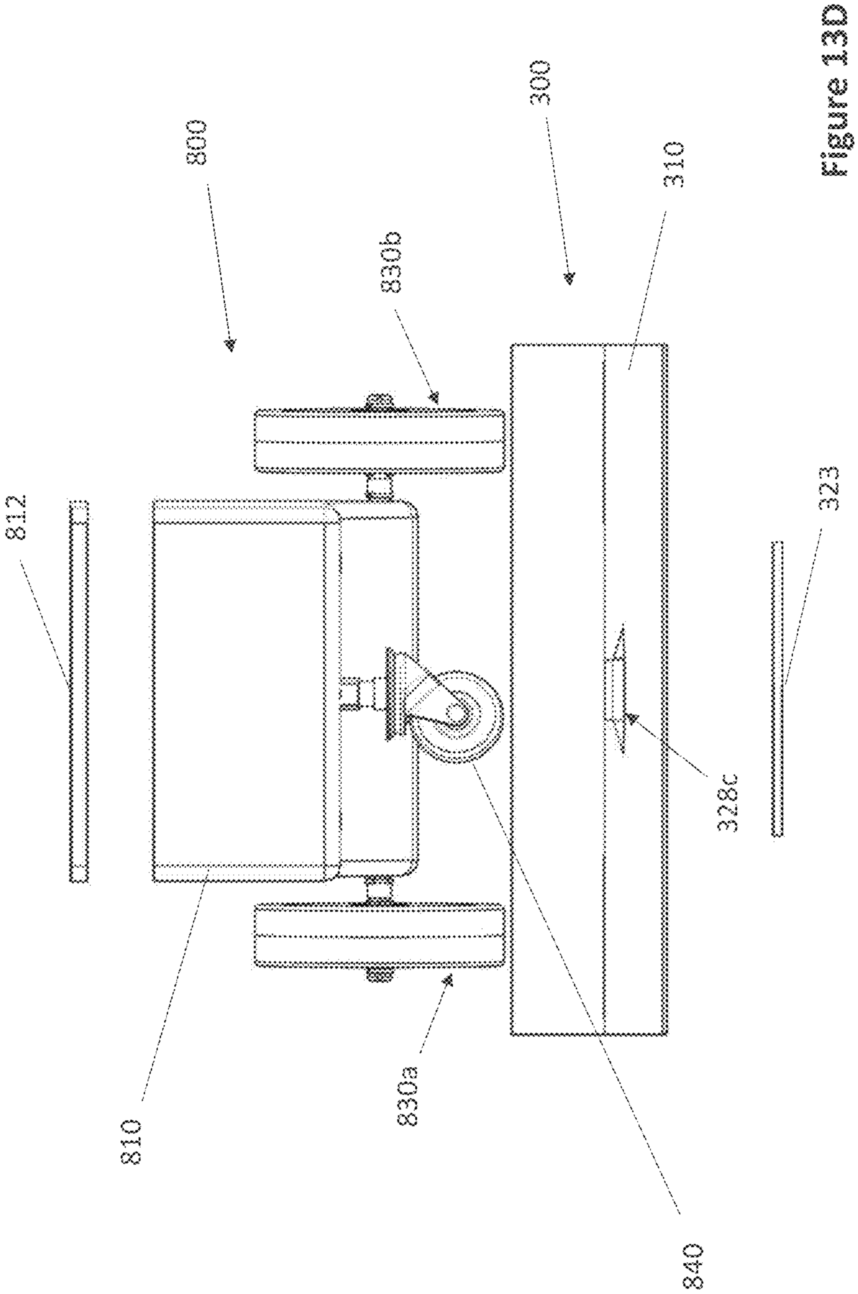
FIG. 13D is a front partially-exploded view of the autonomous waste bin attachment and charging station of FIG. 13A.
Figure 13E:
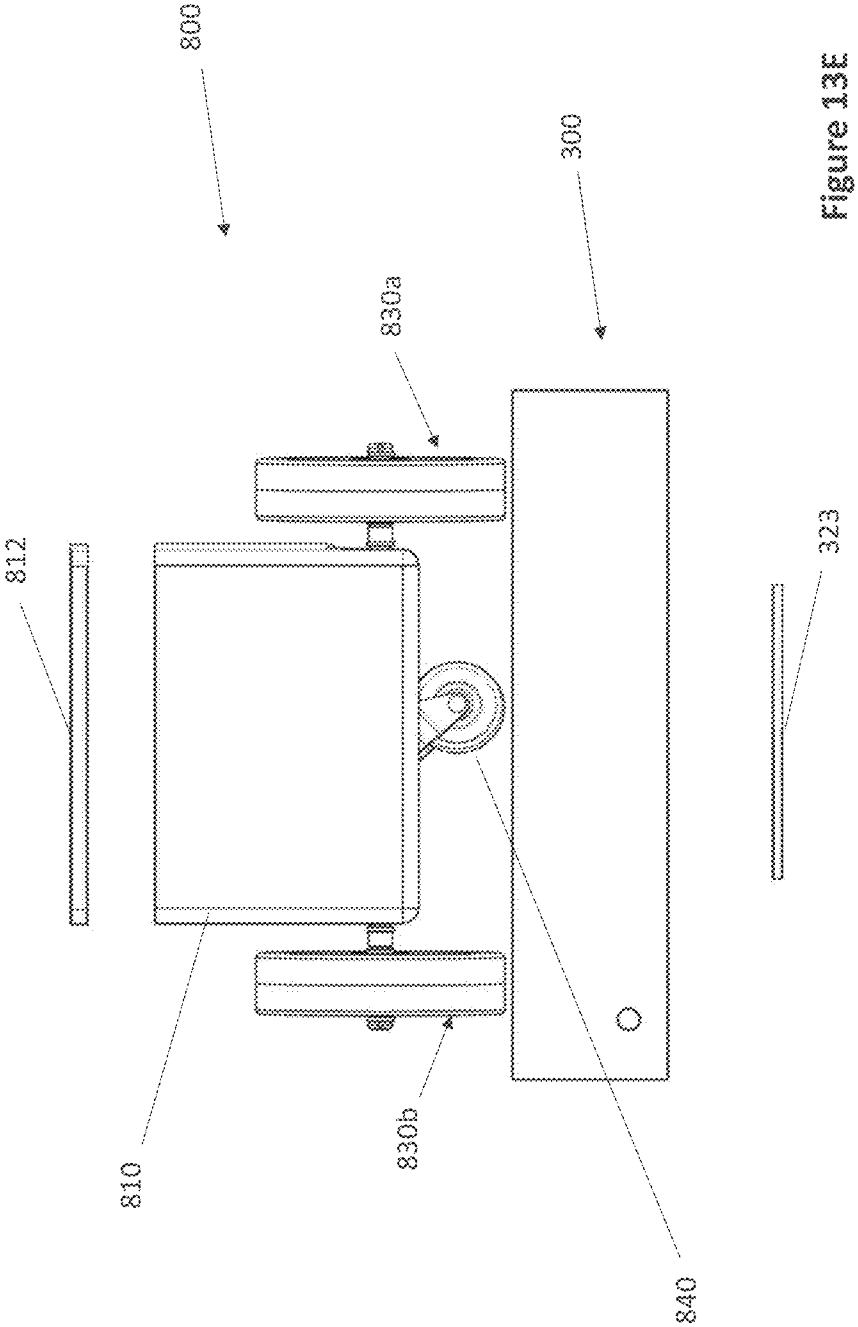
FIG. 13E is a rear partially-exploded view of the autonomous waste bin attachment and charging station of FIG. 13A.

FIG. 13A is a perspective partially exploded view of an autonomous waste bin attachment such as the autonomous waste bin attachment of FIG. 11, shown relative to charging station such as the charging station of FIG. 5. FIG. 13B is a bottom perspective partially exploded view of the autonomous waste bin attachment and charging station of FIG. 13A. FIGS. 13C, 13D, and 13E are side, front, and rear partially exploded views, respectively, of the autonomous waste bin attachment and charging station of FIG. 13A As can be seen in FIG. 13A, the driving wheels 830*a* and 830*b* are respectively aligned with the wheel recesses 328*a* and 328*b*, and the freely rotatable wheel 840 is aligned with the wheel recess 328*c*. Although illustrated at an angle to the direction of the wheel recess 328*c* to show the possible rotation of the freely rotatable wheel 840, the freely rotatable wheel 840 will be aligned with the direction of the wheel recess 328*c* when the autonomous waste bin rolls onto the charging station 300 up the ramp 310.

In the illustrated embodiment, the autonomous waste bin attachment 800 includes a lid 812 which can be selectively secured to internal supports 814 within the body 810, to provide support for a fully loaded waste bin supported by the autonomous waste bin attachment 800. In other embodiments, however, the separate lid 812 may be omitted. It can also be seen in FIG. 13A that the front section of the body 810 can include a section 814 which can contain and protect a portion of the leveling mechanism 842 (not shown in FIGS. 13A-13E).

It can also be seen in FIGS. 13A and 13B that the charging station 300 includes a bottom cover 323 which can be installed over a recess 321 in the bottom surface of the charging station 300. This recess 321 can contain, for example, the wireless charging coils or other elements of the wireless charging system, and can allow access to other internal components of the charging station 300. The cover 323 can in some embodiments be permanently installed over the recess after the charging station 300 is manufactured, while in other embodiments the cover 323 can be removably installed to cover the recess 321 to provide access to the recess 321 and other internal components as needed. The outlets of drain holes 325*a*, 324*b*, and 325*c* are also visible in the bottom perspective view of FIG. 13B.

Figure 14:
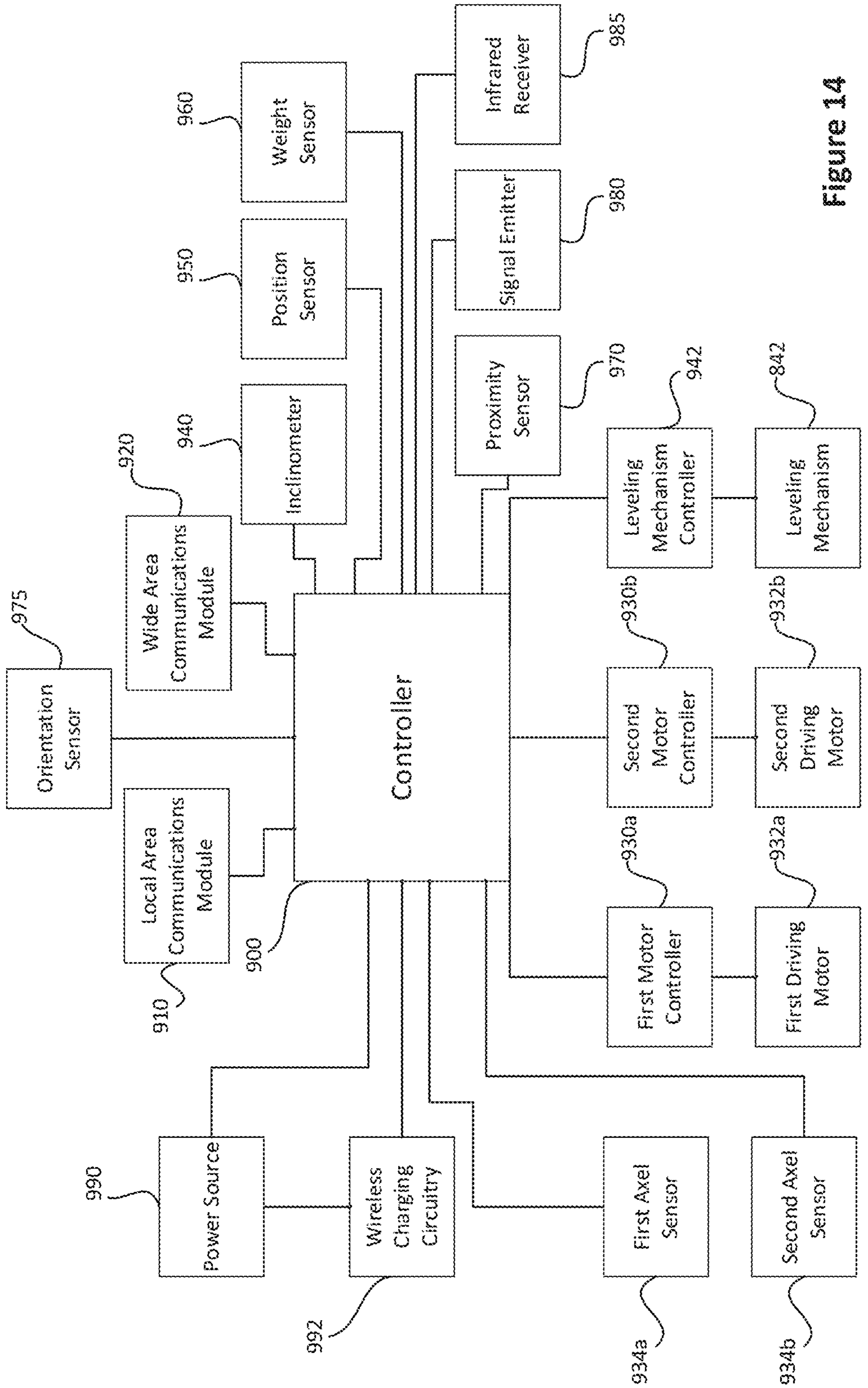
FIG. 14 is a block diagram schematically illustrating various components of the autonomous waste bin attachment of FIG. 11.

FIG. 14 is a block diagram schematically illustrating various components of the autonomous waste bin attachment 800 of FIG. 11. The autonomous waste bin attachment 800 includes a controller 900 which can be used in autonomously controlling the operation of the autonomous waste bin attachment 800. The controller 900 may be similar or identical in many respects to the controller 200 as described above.

In the illustrated embodiment, the controller 900 includes or is in communication with a local area communications module 910 and a wide area communications module 920. The local area communications module 910 and wide area communications module 920 may be similar or identical in many respects to the local area communications module 210 and the wide area communications module 220 as described above.

As can be seen in FIG. 14, the controller 900 is connected via a wired or wireless connection to a first motor controller 930*a* for controlling the first driving motor 932*a* and to a second motor controller 930*b* for controlling the second driving motor 932*b*. The first and second motor controller 930*a* and 930*b* may be similar or identical in many respects to the first and second motor controller 230*a* and 230*b* as described above.

The controller 900 may be connected via a wired or wireless connection to a position sensor 950, a proximity sensor 970, an orientation sensor 975, a signal emitter 980 and/or an infrared receiver 985. The position sensor 950, the proximity sensor 970, the orientation sensor 975, signal emitter 980 and the infrared receiver 985. may be similar or identical in many respects to the position sensor 250, weight sensor 260, proximity sensor 270, orientation sensor 275, signal emitter 280 and infrared receiver 285 as described above.

In some embodiments, the controller 900 is connected via a wired or wireless connection to a weight sensor 960, which can be used to provide an indication of the weight of a waste bin connected to the autonomous waste bin attachment 800. In some embodiments, the weight sensor 960 may provide an indication of the weight of waste or items contained within a receptacle of the waste bin connected to the autonomous waste bin attachment 800. The controller 900 can periodically receive weight information from the weight sensor 960 and can also request weight information from the weight sensor 960 at any time. In some embodiments, the weight information may be transmitted via the local area communications module 910 or via the wide-area communications module 920 to a user device, to a waste collection vehicle, or to cloud servers. Information from the weight sensor 960 can be used, for example, in controlling the movement of the autonomous waste bin attachment 800, such as by limiting the movement speed of the autonomous waste bin attachment 800 based on the weight of the waste bin connected or based on the weight of the bin contents. The weight sensor 960 can also provide information to a waste collection service regarding the weight of the bin contents when a waste bin connected to the autonomous waste bin attachment 800 is ready for waste collection, allowing the waste collection service to anticipate the amount of waste to be collected along a given route and redirect waste collection vehicles as needed to optimize waste collection.

In some embodiments, the weight sensor 960 may be further configured to provide an indication that a waste bin is not connected to the autonomous waste bin attachment 800. In some embodiments, the weight sensor 960 may be configured to provide an indication that a waste bin is not connected to the autonomous waste bin attachment 800 when the weight as detected by the weight sensor 960 drops below a threshold value. In some embodiments, the indication that a waste bin is not connected to the autonomous waste bin attachment 800 may be transmitted to a user device, a cloud server, or a service provider. In some embodiments, a designated contact sensor (not shown) may be included to detect whether the waste bin has been removed, and can also be used to confirm that the autonomous waste bin attachment 800 is securely attached.

The controller 900 may be connected via a wired or wireless connection to an inclinometer 940 and a leveling mechanism controller 942 in communication with the leveling mechanism 842. The inclinometer 940 and leveling mechanism controller 942 may be similar or identical in many respects to the inclinometer 240 and leveling mechanism controller 242 as described above.

In some embodiments, the controller 900 may be connected via a wired or wireless connection to a battery 990 of the autonomous waste bin attachment 800, which may provide an indication of the battery charge state of the battery 990. The controller 900 can periodically receive the battery charge state information from battery 990 and can also request battery charge state information from the battery 990 at any time. In some embodiments, the controller 900 can transmit the battery charge state information to a user device or to a charging station as described above.

In some embodiments, the controller 900 is configured to interact with a locking mechanism of a waste bin. In some embodiments, the autonomous waste bin attachment 800 may not include a locking mechanism. In some embodiments, a locking mechanism may be retrofitted onto a standard waste bin receptacle. The locking mechanism may be similar in many respects to the locking mechanism 150 described above. The locking mechanism may be configured to secure a lid of a standard waste bin receptacle. After a waste bin has been retrofitted with a locking mechanism, a wired or wireless connection between the locking mechanism and the controller 900 may be established. After a connection between the controller 900 and the locking mechanism has been established, the controller 900 may be able to interact with the locking mechanism similarly or identically to how the controller 200 interacts with the locking mechanism 150 as described above. In the event that a wireless connection is made between the controller 900 and the locking mechanism 150, the locking mechanism 150 may include its own power source, such as a replaceable or rechargeable battery.

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. An autonomous waste bin, the autonomous waste bin comprising:

a receptacle with an opening at an upper end of the receptacle;

a lid connected to the receptacle and configured to cover the opening of the receptacle;

a power source;

at least one driving wheel;

at least one driving motor connected to the at least one driving wheel, the at least one driving motor configured to provide a driving force to the at least one driving wheel;

at least one controller in communication with the at least one driving motor; and a transceiver in communication with the at least one controller, the transceiver configured to receive scheduling information from a service provider associated with at least one waste collection vehicle, the scheduling information comprising an estimated collection time, the at least one controller configured to determine a deployment time for moving to a collection location based at least in part on the estimated collection time received from the service provider and the at least one controller configured to control, via the at least one driving wheel, movement of the autonomous waste bin at the determined deployment time.

2. The autonomous waste bin of claim 1, wherein the transceiver comprises a local area communication module configured to receive scheduling information from a local device, and the transceiver configured to communicate via Bluetooth or Wi-fi with the local device.

3. The autonomous waste bin of claim 1, wherein the transceiver comprises a wide area communication module configured to receive scheduling information from a remote device, and the transceiver configured to communicate via 4G, 5G, or Edge with the remote device.

4. The autonomous waste bin of claim 1, wherein the scheduling information comprises at least one of the following: a frequency of collection events, or a range of times during which a collection event may occur.

5. The autonomous waste bin of claim 1, wherein the determined deployment time is randomized within a period of time prior to a next collection event.

6. The autonomous waste bin of claim 1, wherein the at least one controller is configured to transmit collection material weight measured by a weight sensor of the autonomous waste bin to an external device associated with a waste management service.

7. The autonomous waste bin of claim 1, wherein the at least one controller is further configured to transmit information to an external device associated with a waste management service when the autonomous waste bin arrives at a location where it can be serviced by a waste collection vehicle.

8. The autonomous waste bin of claim 7, wherein the information transmitted by the at least one controller comprises a confirmation that the autonomous waste bin has arrived at a designated collection location.

9. The autonomous waste bin of claim 7, wherein the information transmitted by the at least one controller comprises location information associated with the autonomous waste bin.

10. The autonomous waste bin of claim 1, wherein:

the at least one driving wheel comprises first and second driving wheels; and the at least one driving motor comprises first and second driving motors connected to the first and second driving wheels respectively, the first and second driving motor configured to provide a driving force to the first and second driving wheels.

11. A method for deploying an autonomous waste bin for waste collection service, the method comprising:

determining, via a controller of the autonomous waste bin, a deployment time for moving the autonomous waste bin to a waste collection location, based at least in part on scheduling information received via a transceiver of the autonomous waste bin, the scheduling information comprising an estimated collection time;

triggering, at the determined deployment time, movement of the autonomous waste bin along a predefined path between a waste bin storage location and a waste collection location, wherein a locking mechanism of the autonomous waste bin remains in a locked configuration during the movement along the predefined path; and after arrival of the autonomous waste bin at the waste collection location and prior to collection of the contents of the autonomous waste bin by a waste collection service, triggering an unlocking of the locking mechanism of the autonomous waste bin to allow access to the contents of the autonomous waste bin.

12. The method of claim 11, wherein determining a deployment time for moving to the waste collection location comprises randomly selecting a movement time that is prior to a next collection event.

13. The method of claim 11, further comprising transmitting a confirmation to the waste collection service after the autonomous waste bin has arrived at the waste collection location.

14. The method of claim 11, further comprising transmitting an identifier associated with the autonomous waste bin to the waste collection service.

15. The method of claim 11, further comprising transmitting collection material weight information of the autonomous waste bin to an external device.

16. The method of claim 11, wherein the scheduling information received via the transceiver comprises at least one of the following: frequency of collection events, or a range of times during which a collection event may occur.

17. The method of claim 11, further comprising triggering movement of the autonomous waste bin along the predefined back to the waste bin storage location after a collection event has occurred.

18. The method of claim 11, wherein triggering an unlocking of the locking mechanism is accomplished after a waste collection vehicle is within a certain distance of the autonomous waste bin.

19. The autonomous waste bin of claim 1, wherein the determined time is at a different time of day than a previously determined time for movement to the collection location based on a previous estimated collection time at the same time of day as the estimated collection time.

20. The autonomous waste bin of claim 1, wherein the autonomous waste bin comprises a platform configured to support the receptacle, the platform comprising the power source, the at least one driving wheel, and the at least one driving motor.

21. The autonomous waste bin of claim 1, further comprising an additional wheel, the additional wheel positioned along a central longitudinal axis of the autonomous waste bin and longitudinally offset from an axis of rotation of the at least one driving wheel, the central longitudinal axis extending perpendicular to the axis of rotation of the at least one driving wheel.

22. The autonomous waste bin of claim 21, wherein the at least one driving wheel comprises first and second driving wheels configured to rotate around the same axis of rotation, and wherein the central longitudinal axis is located within a plane passing through a midpoint between the first and second driving wheels.

23. An autonomous waste bin, the autonomous waste bin comprising:

a platform configured to support a receptacle, the platform comprising:

a power source;

at least one driving wheel; and at least one driving motors connected to the at least one driving wheel respectively, the at least one driving motor configured to provide a driving force to the at least one driving wheel;

at least one controller in communication with the at least one driving motor; and a transceiver in communication with the at least one controller, the transceiver configured to receive scheduling information and the at least one controller configured to control, via the at least one driving wheel, movement of the autonomous waste bin based at least in part on the scheduling information received via the transceiver.

* * * * *